(12) United States Patent  
Weaver

(10) Patent No.: US 9,175,816 B2  
(45) Date of Patent: Nov. 3, 2015

(54) SYSTEM AND METHOD FOR MIXING LIGHT FOR A LED-BASED LINEAR LIGHT SOURCE

(71) Applicant: Lumenetix, Inc., Scotts Valley, CA (US)

(72) Inventor: Matthew D. Weaver, Aptos, CA (US)

(73) Assignee: LUMENETIX, INC., Scotts Valley, CA (US)

( * ) Notice: Subject to any disclaimer, the term of this patent is extended or adjusted under 35 U.S.C. 154(b) by 0 days.

(21) Appl. No.: 13/918,798

(22) Filed: Jun. 14, 2013

(65) Prior Publication Data

US 2013/0272015 A1    Oct. 17, 2013

Related U.S. Application Data

(60) Division of application No. 13/815,914, filed on Mar. 15, 2013, which is a continuation-in-part of application No. 13/367,187, filed on Feb. 6, 2012.

(51) Int. Cl.

| | | |
|---|---|---|
| *F21V 7/04* | (2006.01) | |
| *H01L 33/00* | (2010.01) | |
| *F21V 9/00* | (2006.01) | |
| *G02B 6/00* | (2006.01) | |
| *G06F 13/00* | (2006.01) | |
| *F21K 99/00* | (2010.01) | |
| *F21V 7/00* | (2006.01) | |
| *F21V 8/00* | (2006.01) | |
| *F21V 21/14* | (2006.01) | |
| *F21V 17/04* | (2006.01) | |

(52) U.S. Cl.  
CPC ... *F21K 9/54* (2013.01); *F21K 9/52* (2013.01); *F21K 9/90* (2013.01); *F21V 7/0066* (2013.01); *F21V 17/04* (2013.01); *F21V 21/14* (2013.01); *G02B 6/0096* (2013.01)

(58) Field of Classification Search  
USPC .................................. 362/555, 23.1, 551, 231  
See application file for complete search history.

(56) References Cited

U.S. PATENT DOCUMENTS

| | | | |
|---|---|---|---|
| 4,992,704 A | 2/1991 | Stinson | |
| 6,621,973 B1 * | 9/2003 | Hoffman | 385/133 |
| 6,785,049 B1 * | 8/2004 | Boyd et al. | 359/485.03 |
| 7,048,425 B2 * | 5/2006 | You et al. | 362/555 |
| 7,178,942 B2 * | 2/2007 | Chen et al. | 362/231 |
| 7,300,192 B2 | 11/2007 | Mueller et al. | |
| 7,410,283 B2 * | 8/2008 | West et al. | 362/573 |
| 7,506,998 B2 | 3/2009 | Ansems et al. | |
| 7,512,300 B2 * | 3/2009 | Robertson et al. | 385/101 |
| 7,524,098 B2 | 4/2009 | Vennetier et al. | |
| 7,658,528 B2 | 2/2010 | Hoelen et al. | |
| 8,240,865 B2 | 8/2012 | Park | |

(Continued)

OTHER PUBLICATIONS

Co-Pending U.S. Appl. No. 13/815,914 by Weaver, M. et al., filed Mar. 15, 2013.  
Co-Pending U.S. Appl. No. 13/918,801 by Weaver, M. et al., filed Jun. 14, 2013.  
Co-Pending U.S. Appl. No. 13/918,812 by Weaver, M. et al., filed Jun. 14, 2013.

(Continued)

*Primary Examiner* — Peggy Neils  
*Assistant Examiner* — William N Harris  
(74) *Attorney, Agent, or Firm* — Perkins Coie LLP

(57) ABSTRACT

A linear light source and a method of manufacturing the linear light source are disclosed. The linear light source includes a light emitting diode (LED) array, a light pipe, and a shell with a linear exit slit aperture. Cutouts of the light pipe provides a slanted surface to reflect portions of light rays along the length of the light pipe out of the linear exit slit aperture.

19 Claims, 38 Drawing Sheets

(56) References Cited

U.S. PATENT DOCUMENTS

| | | |
|---|---|---|
| 8,494,337 B2 | 7/2013 | Grötsch |
| 8,833,969 B2 | 9/2014 | Speier et al. |
| 2002/0080615 A1 | 6/2002 | Marshall et al. |
| 2006/0126343 A1 | 6/2006 | Hsieh et al. |
| 2008/0062682 A1 | 3/2008 | Hoelen et al. |
| 2009/0201677 A1 | 8/2009 | Hoelen et al. |
| 2010/0254152 A1* | 10/2010 | Taleb-Bendiab et al. ..... 362/551 |
| 2012/0224363 A1 | 9/2012 | Van de Ven |

OTHER PUBLICATIONS

Final Office Action Mailed Apr. 11, 2014 in Co-Pending U.S. Appl. No. 13/815,914, filed Mar. 15, 2013.

Non-Final Office Action Mailed Nov. 20, 2013 in Co-Pending U.S. Appl. No. 13/815,914, filed Mar. 15, 2013.

Non-Final Office Action Mailed Nov. 7, 2014, in U.S. Appl. No. 13/815,914, filed Mar. 15, 2013.

Non-Final Office Action mailed Sep. 30, 2014, U.S. Appl. No. 13/918,801 by Weaver, M. et al., filed Jun. 14, 2013.

\* cited by examiner

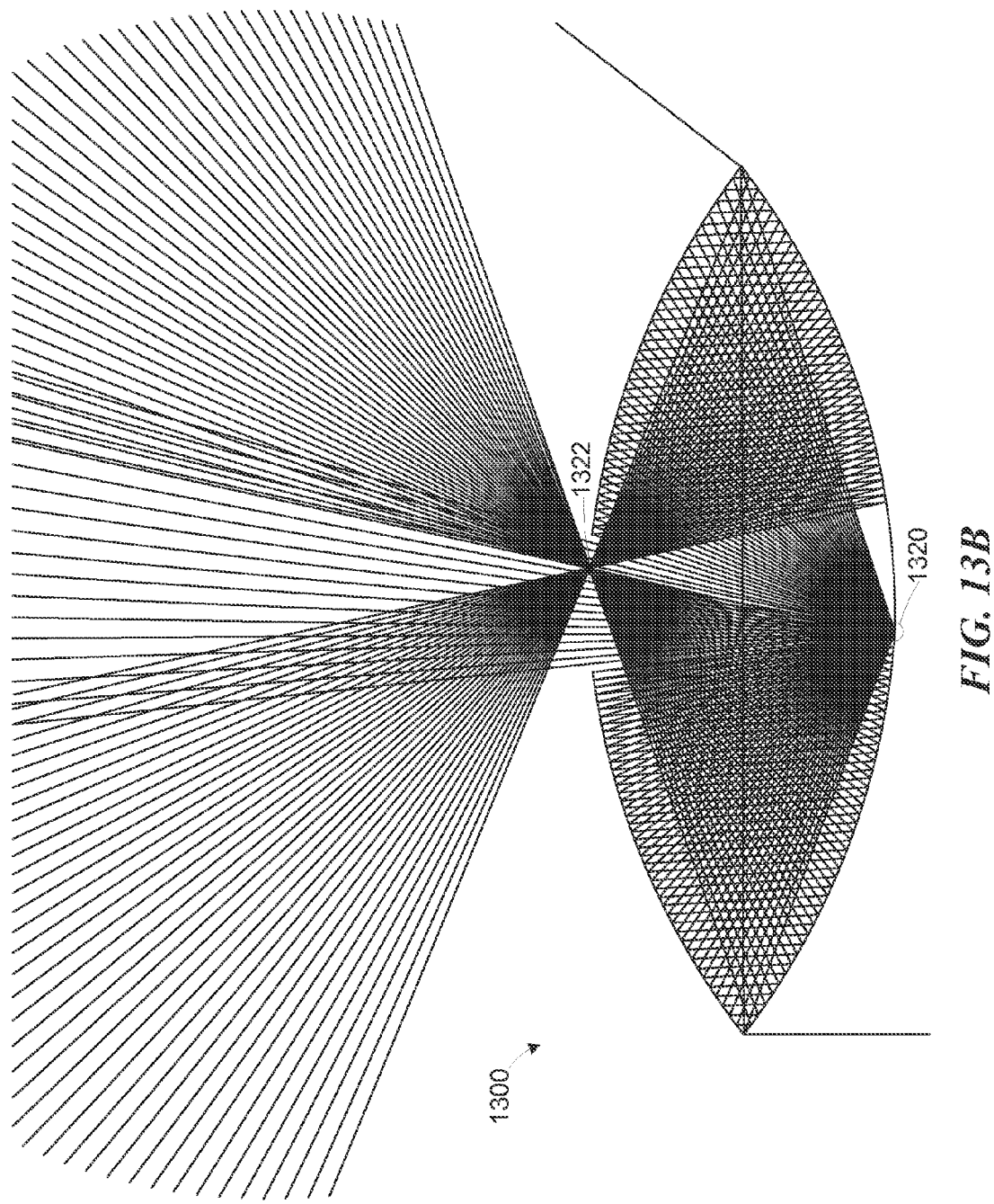

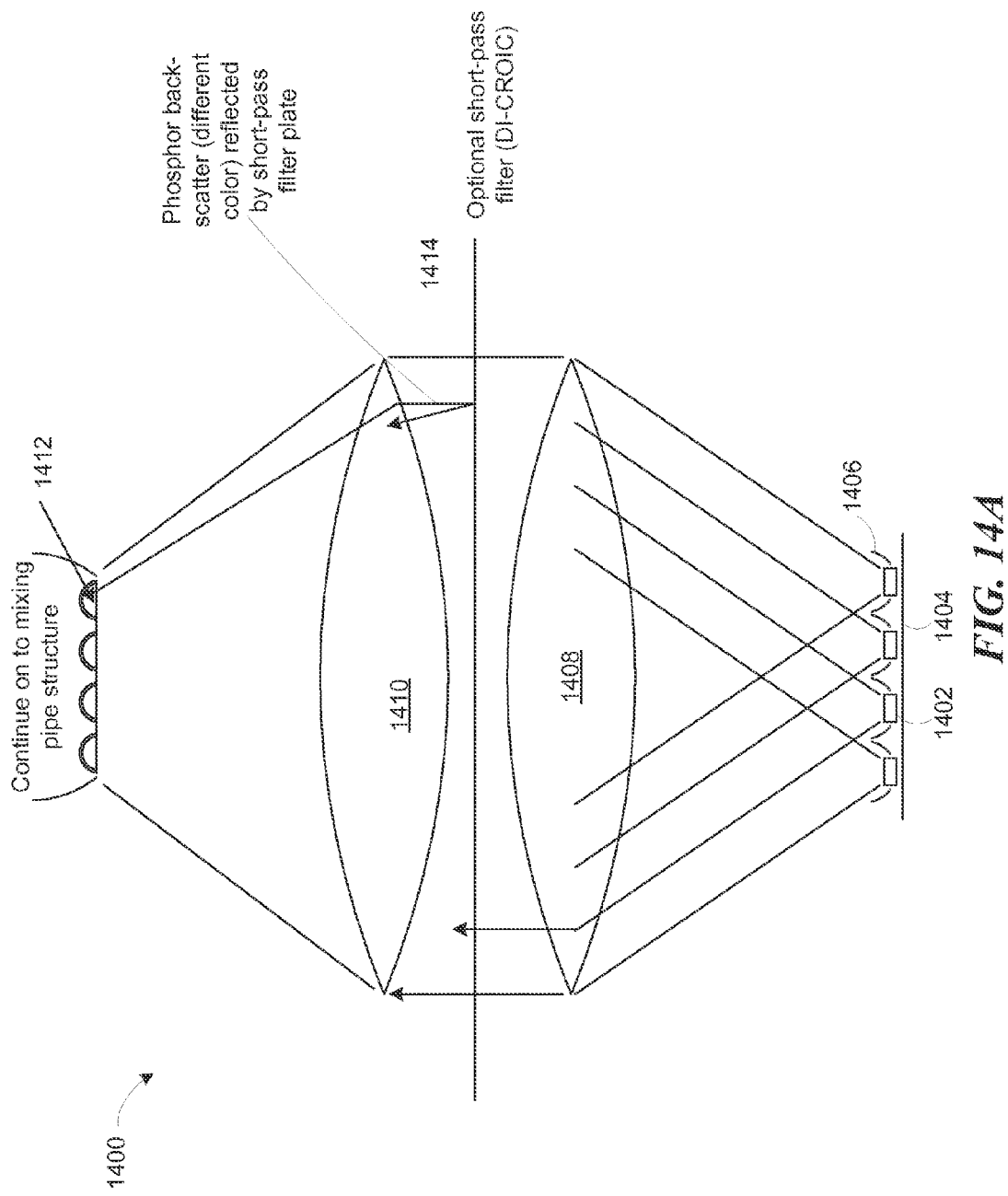

SYSTEM AND METHOD FOR MIXING LIGHT FOR A LED-BASED LINEAR LIGHT SOURCE

CROSS-REFERENCES TO RELATED APPLICATIONS

This application is a divisional of U.S. patent application Ser. No. 13/815,914, filed on Mar. 15, 2013, which is a continuation-in-part of U.S. patent application Ser. No. 13/367,187, filed on Feb. 6, 2012. Both applications are incorporated herein by reference in their entirety.

BACKGROUND

Light emitting diodes (LEDs) that emit at different wavelength bands can be used together to provide light that has a desired color temperature, for example, simulating a particular light source. However, the limitations of the LEDs have previously prevented the LEDs from completely replacing the existing light sources of today, such as incandescent light bulbs, halogen spot lights, and linear fluorescent bulbs.

BRIEF DESCRIPTION OF THE DRAWINGS

Examples of an LED-based lighting system are illustrated in the figures. The examples and figures are illustrative rather than limiting.

FIG. 13B illustrates light ray patterns within the remote phosphor light source.

FIG. 14A illustrates a cross-sectional view of a remote phosphor light source.

DETAILED DESCRIPTION

A mixing barrel apparatus is described for mixing light from an array of LEDs that emit light having different colors. Although the array can be quite large, the mixing barrel funnels the light from the array and re-emits the light from a smaller area, thus resulting in a narrow beam pattern being emitted from the lamp that houses the LED array. Additionally, as the light reflects multiple times from the inner surface of the mixing barrel, the light from the different color LEDs are mixed. In one embodiment, the mixing barrel has an air cavity. In another embodiment, the mixing barrel contains a transparent refractive block that causes at least a portion of the light emitted by the LED array to be totally internally reflected within the refractive block to minimize loss of light occurring upon reflection from the mixing barrel surface.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

A light emitting diode (LED) emits light in a narrow band of wavelengths. Two or more LEDs emitting in different wavelength bands can be used together in a lamp to generate composite light having a desired color temperature. When light from multiple LEDs are used together, the light from the LEDs should be mixed so that the light appears uniform, rather than as localized spots of different color light. Additionally, when multiple LEDs are used in an LED array, the array has a large area and does not provide a narrow output beam angle. Described below is a mixing barrel that can be used to homogenize the light emitted from an LED array and to effectively provide a small source with a narrow output beam angle.

Mixing Barrel with Air Cavity

Figure 1:
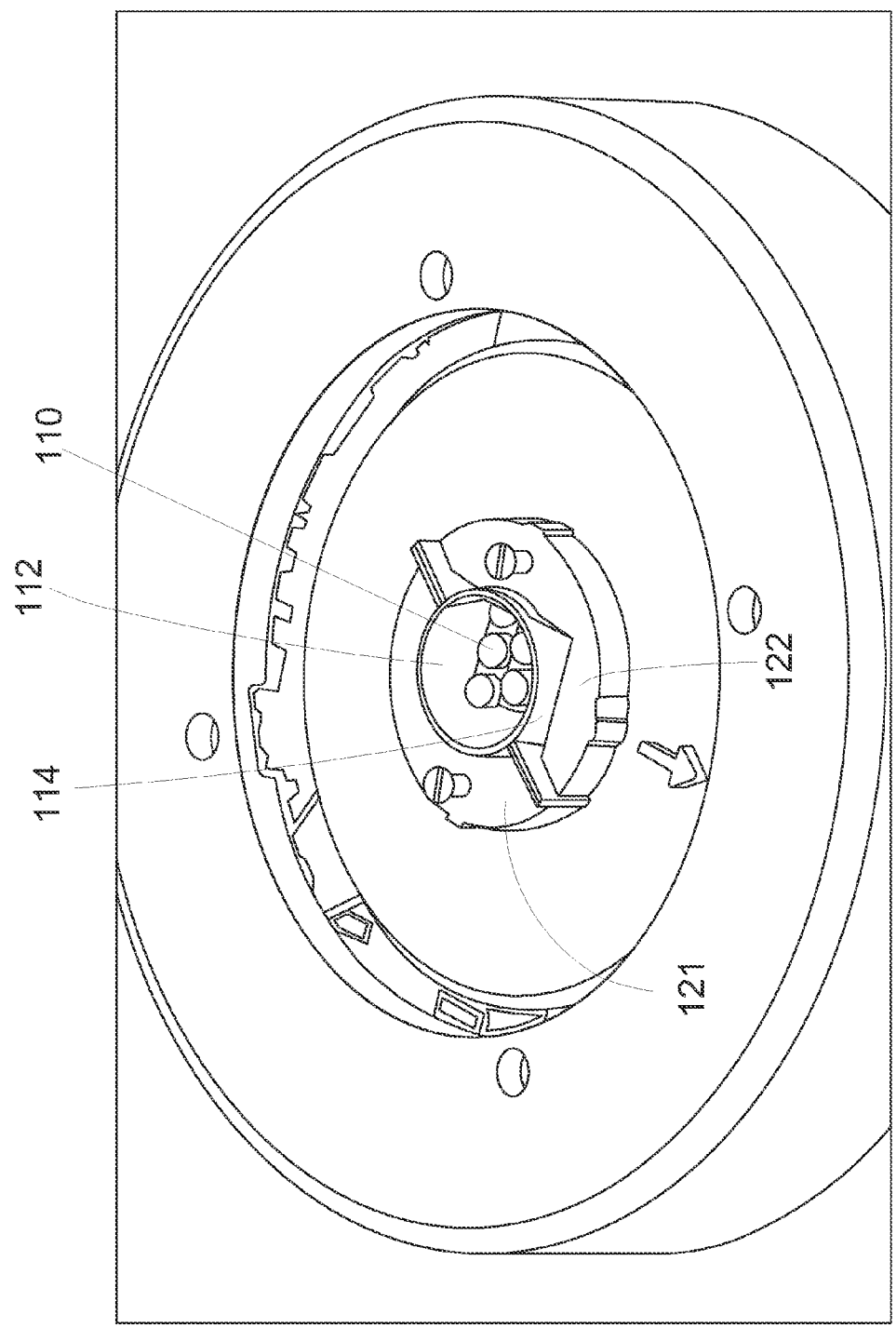
FIG. 1 shows a perspective view illustrating an example mixing barrel in an LED-based lamp.

FIG. 1 shows a perspective view illustrating an example mixing barrel in an LED-based lamp. The LED-based lamp includes an LED array 110 that has multiple LEDs, and the LEDs emit light at two or more different wavelength bands.

In one embodiment, the mixing barrel has two sections 112, 114 that are clamped together by holders 121, 122. In one embodiment, the holders 121, 122 suspend the mixing barrel sections 112, 114 slightly above the LED array 110 so that there is a clearance space between the mixing barrel and the LED array 110 to prevent pressure from being placed on the array.

In one embodiment, each of the sections 112, 114 of the mixing barrel is made from formable sheet metal, such as aluminum. The lower edge of the sheet metal sections that is closest to the LED array is crimped to form a shape that conforms, or nearly conforms, to the shape of the LEDs in the array, while the upper edge of the sheet metal sections farthest from the array is smooth. Note that while the terms 'lower edge' and 'upper edge' are used to describe the mixing barrel, the mixing barrel can be oriented in any direction. Because the lower edge of the barrel is crimped to follow the small features that correspond to the shape of the LEDs, the metal of the mixing barrel should be fairly thin. By shaping the lower edge of the mixing barrel to match the shape of the LEDs, the amount of light emitted by the LEDs that is captured by the mixing barrel can be maximized. Additionally, the total length of the crimped lower edge and the smooth upper edge are substantially equal for ease of manufacturing the mixing barrel.

Once captured, the light from the LEDs reflects multiple times against the inner surface of the mixing barrel as it is funneled towards the upper edge of the mixing barrel. In one embodiment, the inner surface of the mixing barrel is coated with a highly reflective specular coating, such as a silver coating. By using a highly reflective specular coating, the energy lost each time light from the LEDs reflects from the surface of the mixing barrel is minimized. Further, a transparent coating, such as silicon dioxide, can be placed over the specular coating as a protective layer.

In one embodiment, instead of coating the inner surface of the mixing barrel with a highly reflective coating, a highly reflective diffusive substrate can be used, such as White97 film or DuPont™ DLR80 from WhiteOptics of Newark, Del. or a Teflon™-based solid, such as Gore DRP from W. L. Gore & Associates, Inc. of Newark, Del. By using a highly reflective diffuse material, light impinging on the surface is reflected at multiple angles, resulting in further mixing of the different colors of light from the LEDs.

In another embodiment, the mixing barrel can be formed using a plastic injection-molded mixing barrel that is electroless nickel plated to form a metallic base coat. The base coat is then coated with a highly reflective specular coating, such as silver or aluminum, and optionally coated with a high reflectivity dielectric stack coating.

In yet another embodiment, the mixing barrel can be made from press-molded glass that is coated with a highly reflective specular coating.

With either the press-molded glass or plastic injection-molded mixing barrel, the diffusive reflective materials specified above can be conformally applied to the surface of mixing barrel. Alternatively, there are diffuse white reflector coatings that can be applied to the mixing barrel surface that have nearly the same performance but are more delicate. For example, barium sulfate ($BaSO_4$) can be applied as a powder-spray to the surface by using a carrier solution such as polyvinyl alcohol (PVA). High reflectivity white diffuse paints can also be used that typically contain a high percentage of $BaSO_4$.

Figure 2A:
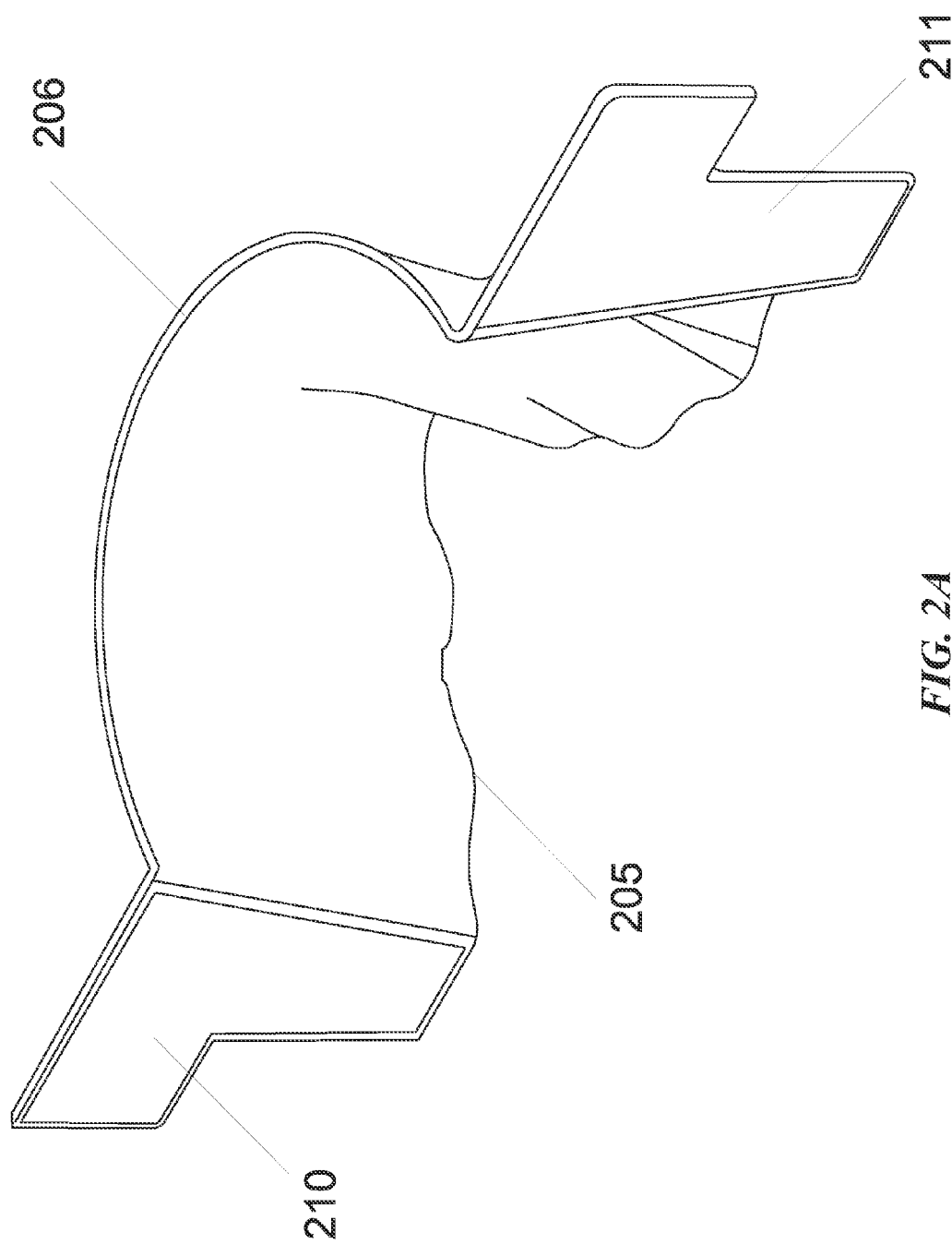
FIG. 2A shows a perspective view of an example section of the mixing barrel.
Figure 2B:
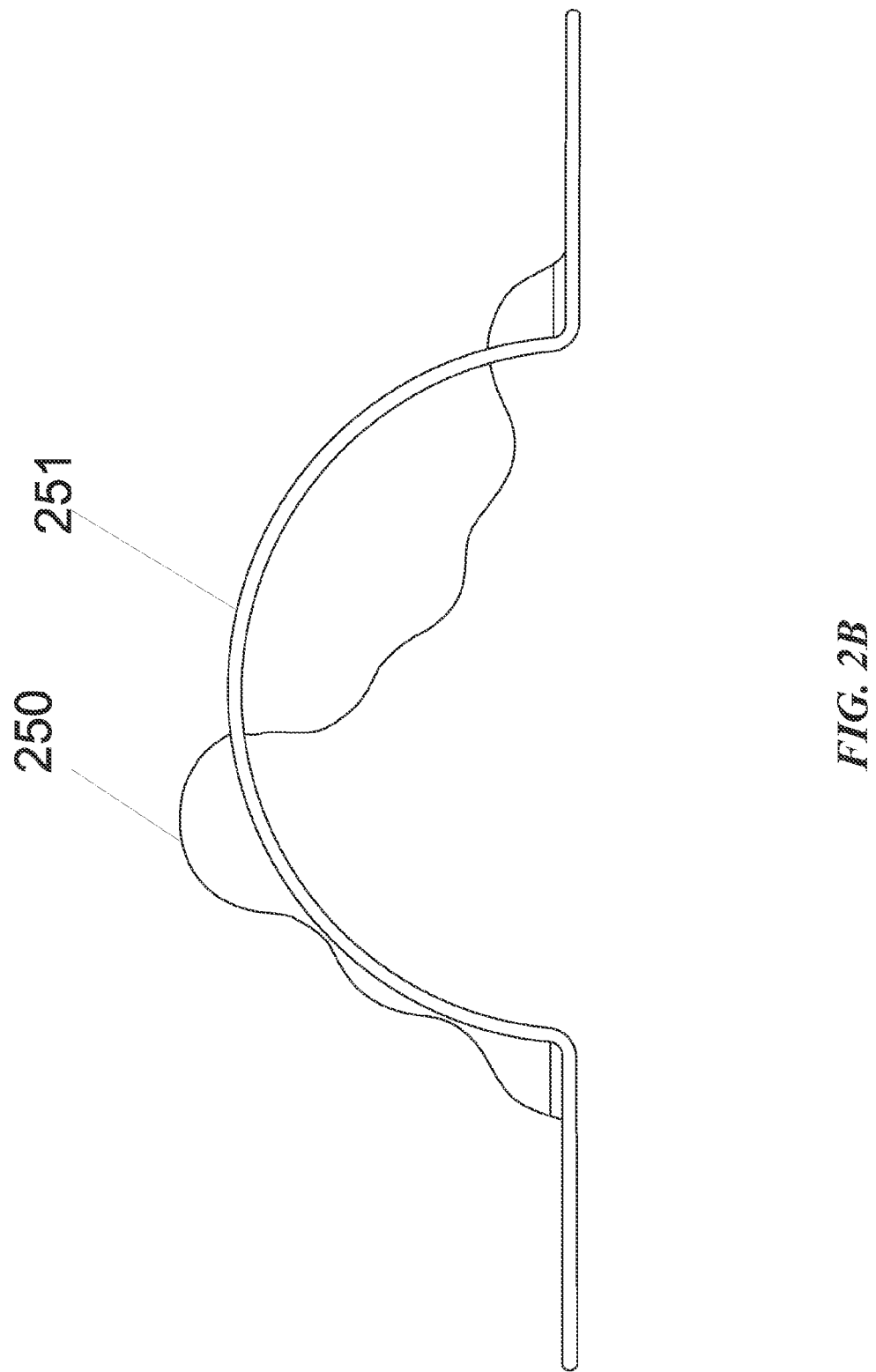
FIG. 2B shows a superposition of the shape of the lower edge and the upper edge of an example mixing barrel section.

FIG. 2A shows a perspective view of an example section of the mixing barrel. The crimped lower edge 205 is gradually smoothed into, in this example, a half circle at the upper edge 206. FIG. 2B shows a superposition of the shape of the lower edge 250 and the shape of the upper edge 251 of an example mixing barrel section.

Additionally, in this example, the mixing barrel section has two flat portions 210, 211 at the ends. These flat portions 210, 211 are clamped to the corresponding flat portions on the opposing mixing barrel section to form the reflective cavity of the mixing barrel.

Figure 3:
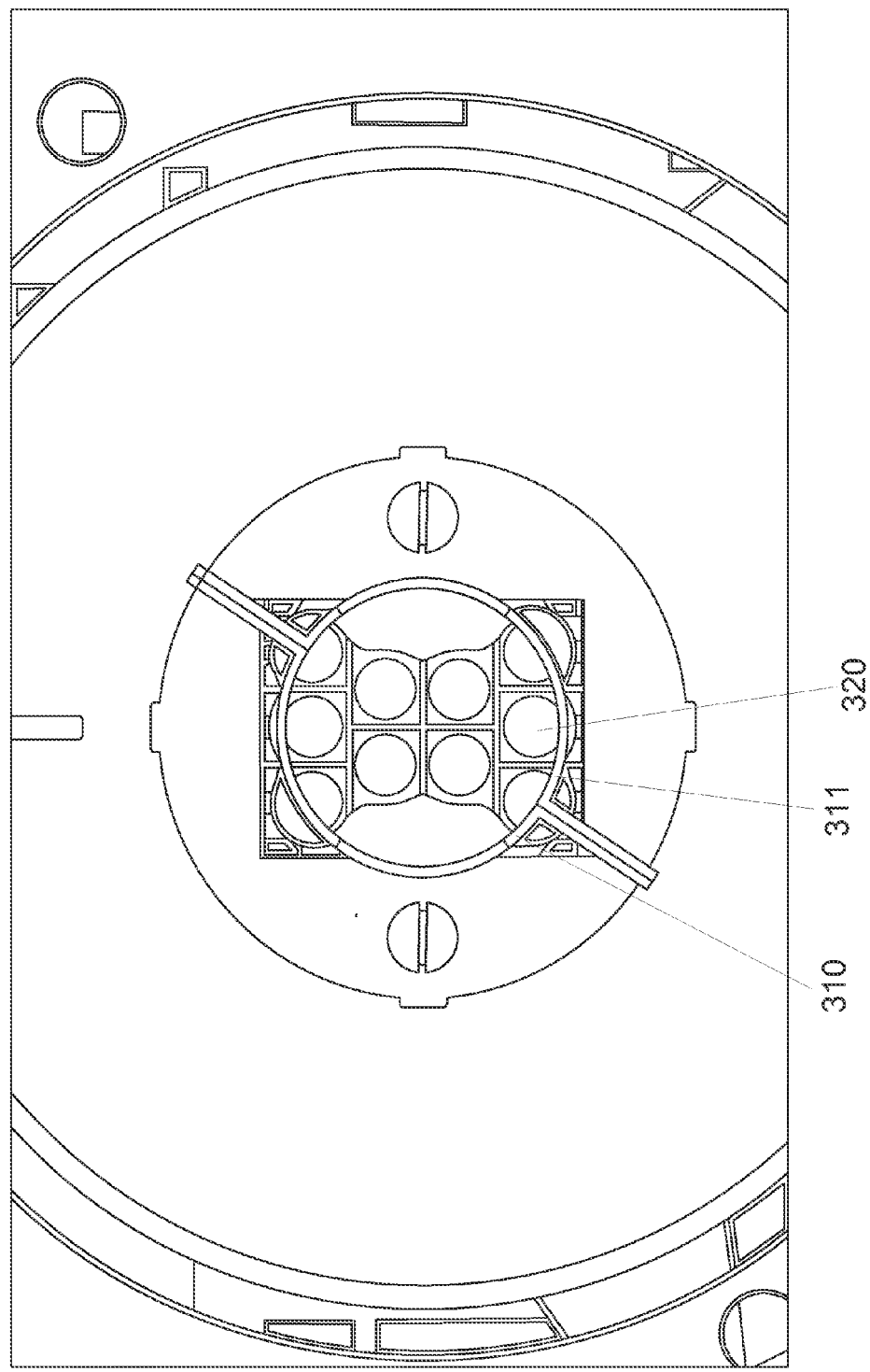
FIG. 3 shows a top view of example mixing barrel sections clamped together.

FIG. 3 shows a top view of example mixing barrel sections 310, 311 clamped together. The holder clamping the mixing barrel sections together is shown to be transparent in this figure to show the relative positioning of the LED array 320 and the mixing barrel sections 310, 311.

Figure 4:
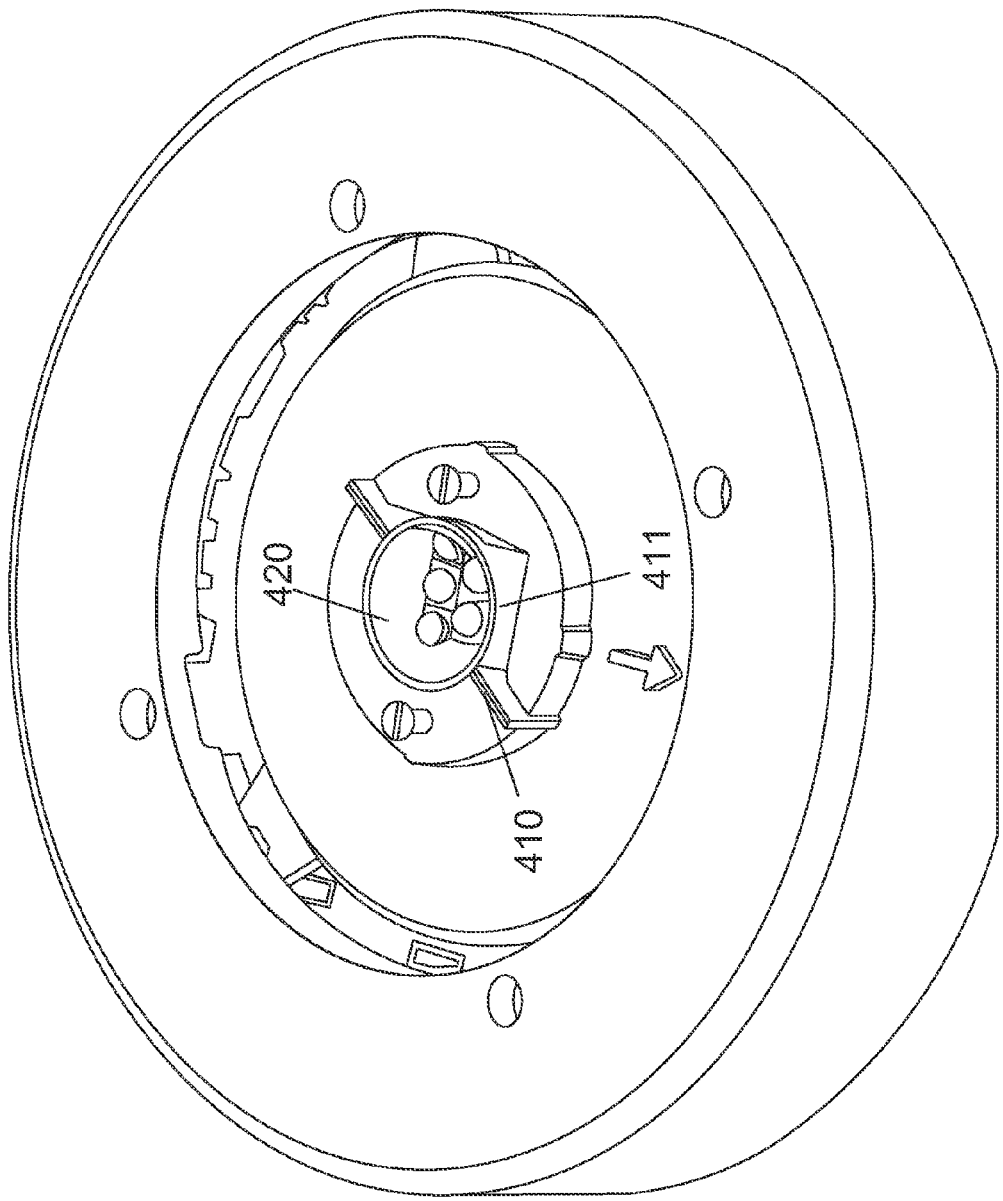
FIG. 4 shows a perspective view illustrating an example mixing barrel covered by a diffuser plate.

FIG. 4 shows a perspective view of example mixing barrel sections 410, 411 with a diffuser 420 seated on the upper edge of the sections 410, 411. The diffuser serves to further mix the light from the different color LEDs exiting beyond the upper edge of the mixing barrel to smooth out any hot spots from the individual LEDs in the LED array. The diffuser can be made from plastic or glass.

Figure 5:
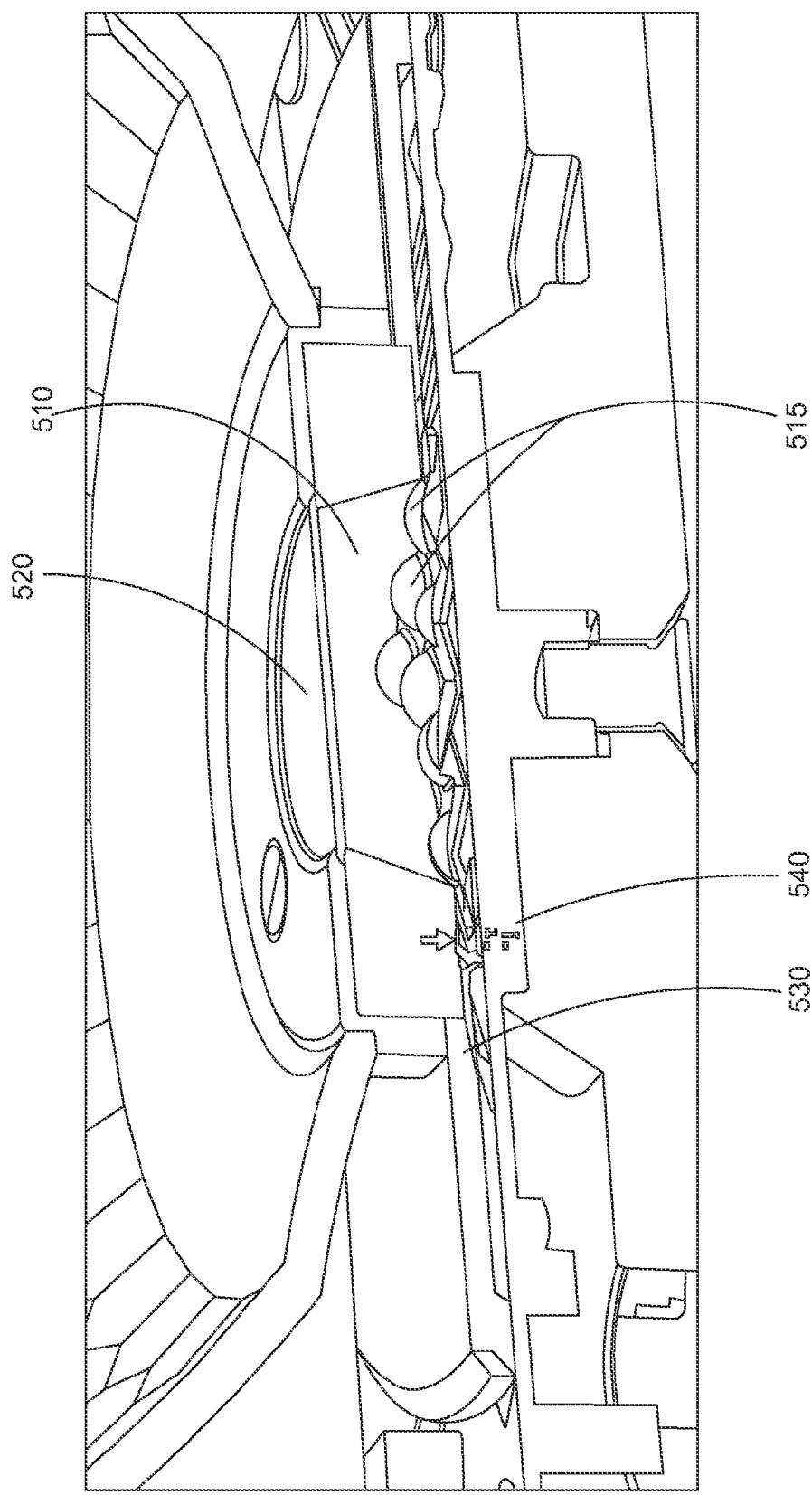
FIG. 5 shows a cross-section of an example LED-based lighting system that includes a mixing barrel.

FIG. 5 shows a cross-section of an example LED-based lighting system that includes the mixing barrel 510. In one embodiment, the mixing barrel 510 is seated on a supporting plate 530 so that the mixing barrel does not contact the LED array 515. The small gap 540 between the LED array and the mixing barrel 510 is in a low loss region where the amount of direct light flux from the LEDs is very low and the scatter flux density of light from within the mixing barrel is also low. Further, FIG. 5 shows the diffuser plate 520 seated on the top edge of the mixing barrel 510.

Mixing Barrel with Refractive Block

Despite the use of highly reflective coatings on the inner surface of the mixing barrel, each time light reflects from the inner surface of the mixing barrel, some energy is lost since even the best reflective coatings are lossy. One way to minimize the number of reflections against the wall of the mixing barrel while still sufficiently mixing the light from the LEDs is to use a total internal reflection (TIR) mechanism within the mixing barrel. In one embodiment, a block of refractive material is used to replace a portion of the air cavity within the mixing barrel. Because the light from the LED array that impinges on the mixing barrel can have a large range of incidence angles, it is difficult to design a shape for the refractive material that causes all the light from the LED array to be totally internally reflected. However, the shape of the refractive block is designed with the result that at least some of the light from the LEDs undergoes total internal reflection within the refractive block.

While the refractive block is placed within the mixing barrel, there should be a narrow air gap between the refractive block and the inner wall of the mixing barrel to ensure that the TIR mechanism works. Any contact between the refractive block and the mixing barrel wall causes light to leak out to the mixing barrel wall and reflect off of the wall with the accompanying energy loss.

Similarly, if there is contact between the refractive block and the mixing barrel, light reflected onto the points of contact can leak out. However, in some embodiments, it may be advantageous to optically couple the refractive block to the LED array by placing an optical silicone gel between the refractive block and the optical silicone gel dome that is already present on high-volume single LED packages. Then the additional optical silicone gel acts as an index matching material to minimize the loss of light entering the mixing barrel.

In one embodiment, a diffuser plate is bonded to the top of the refractive block, and the diffuser plate is seated on top of the mixing barrel's upper edge. This arrangement suspends the refractive block above the LED array below the mixing barrel, thus preventing the refractive block from making contact with the LED array.

The diffuser plate can also serve as a registration mechanism to center the refractive block within the mixing barrel so that there is an air gap between the mixing barrel reflective wall and the refractive block on all sides.

Another advantage to using the refractive block is that it acts as a heat sink for the diffuser plate. In the configuration for the mixing barrel that has an unfilled air cavity, the diffuser plate itself is very thin and thus, has a very small heat capacity. Further, it is surrounded above and below by air that acts as an insulator. If the surface of the diffuser has an impurity, for example, flecks of dust, the impurity will absorb the energy of the light and produce carbonization on the diffuser material causing further energy absorption and eventually burning up the diffuser. However, if the diffuser material is laminated to the refractive block, the block acts as a heat sink for any heat energy absorbed by the diffuser, thus mitigating heat build up at the diffuser.

Figure 6:
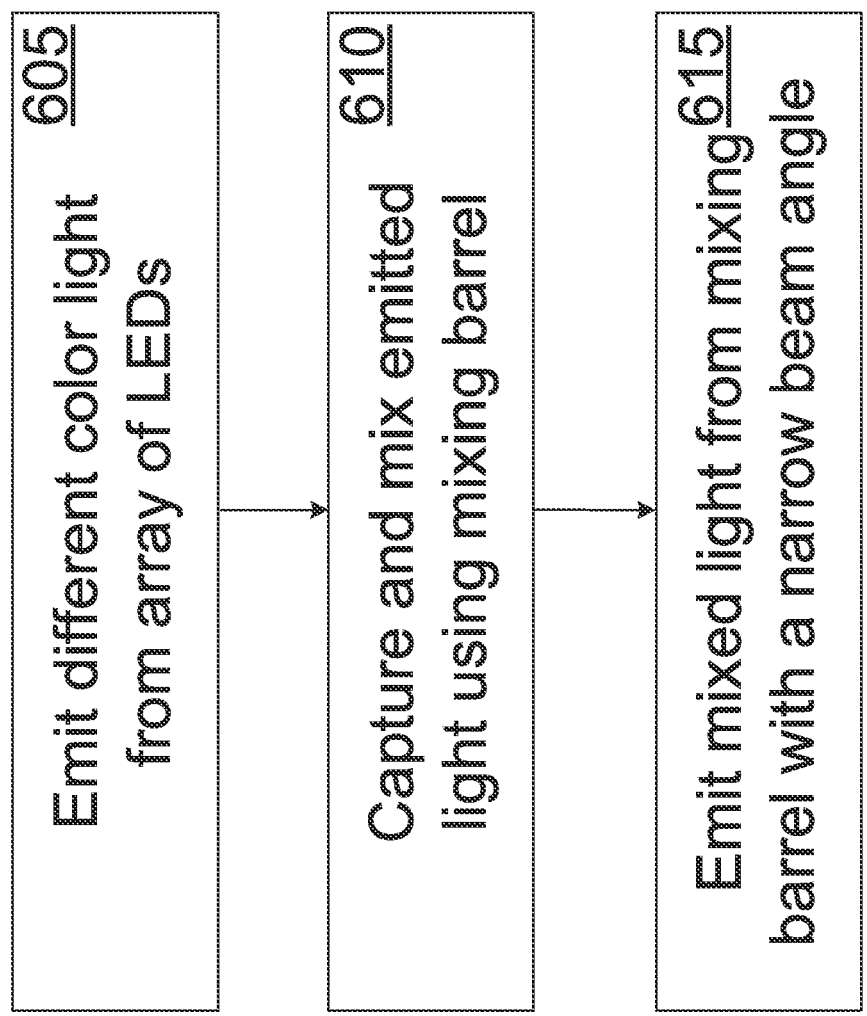
FIG. 6 is a flow diagram illustrating an example process of mixing light from an LED array using a mixing barrel.

FIG. 6 is a flow diagram illustrating an example process of mixing light from an LED array using a mixing barrel. At block 605, the system emits light from an array of LEDs, and the LEDs emit light at different wavelength bands.

Then at block 610, the light emitted from the LED array is captured by the mixing barrel. If the mixing barrel has an air cavity, the captured light is mixed as a result of multiple reflections of the light from the inner reflective surface of the mixing barrel. If the mixing barrel has a refractive block, that light is either totally internally reflected within the block or exits the block to be reflected by the inner reflective surface of the mixing barrel and re-enters the refractive block. The light continues to be either totally internally reflected or reflected by the mixing barrel surface until at block 615, the funnel shape of the mixing barrel causes the light to be emitted from the top of the mixing barrel with a narrow beam angle. In one embodiment, the top of the mixing barrel is covered with a diffuser to further diffuse the light emitted from the mixing barrel.

The light emitted from the mixing barrel, with or without the diffuser, is nearly Lambertian. However, because the exit window of the mixing barrel is relatively small, it acts as a smaller source having a lower etendue than the LED array would have alone. As a result, secondary optics used in conjunction with the mixing barrel can generate narrower beam angles than the LED array alone.

High Density LED Array

Figure 7:
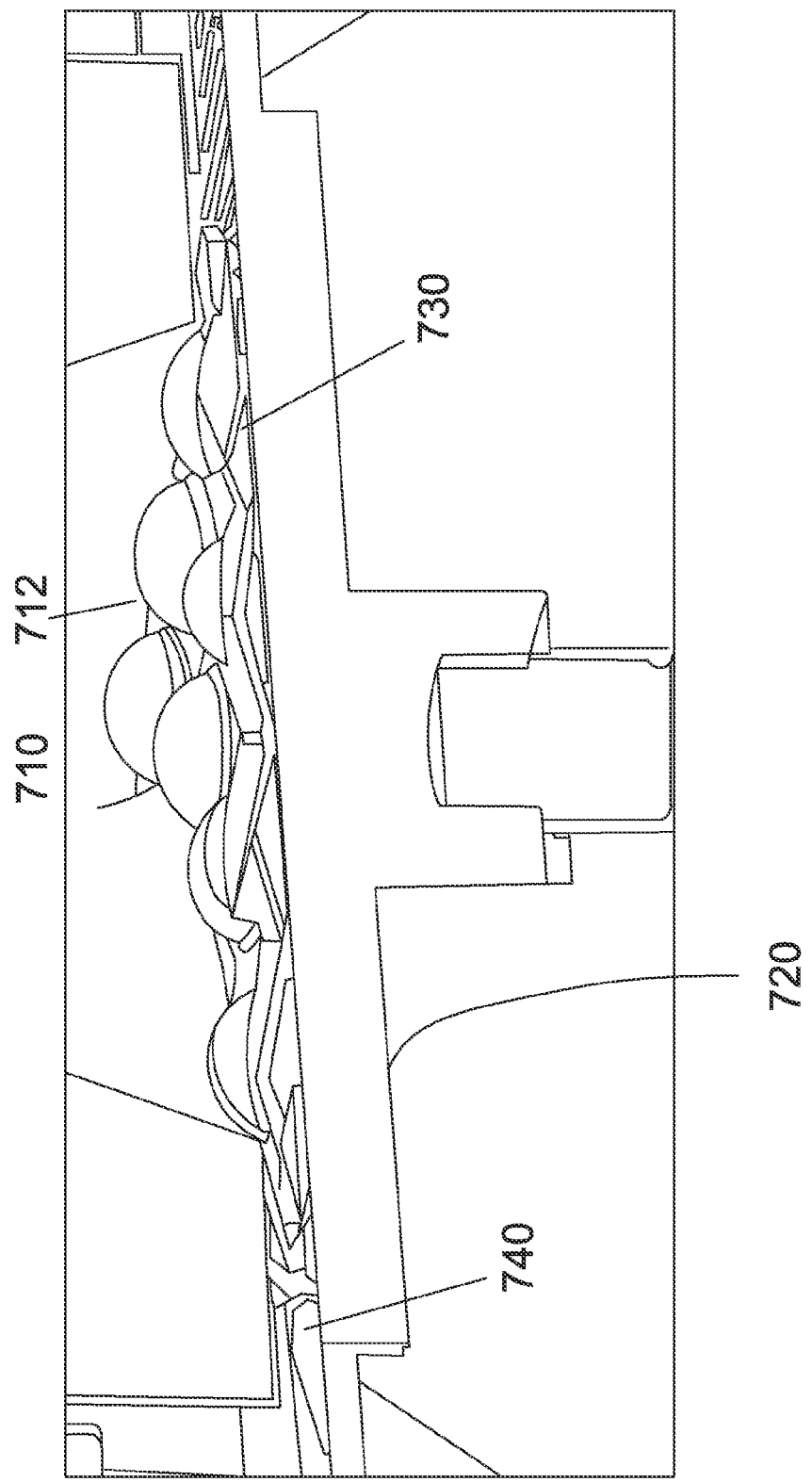
FIG. 7 shows a perspective view illustrating a sample apparatus including a high density LED array.

A lighting apparatus having a high density LED array using high volume, low cost, reliable LEDs is described. The apparatus may utilize the mixing barrel discussed in previous sections of the disclosure. FIG. 7 illustrates a sample apparatus including a high density LED array. The apparatus 700 includes a planar array 710 of LEDs 712. In one embodiment, the LEDs 712 are high-power LED packages such as Lumiled Luxeon Rebel or CREE XRG. These LED packages are highly-tested, high-volume, proven LED packages. The LEDs 712 are mechanically mounted on top of a heat conductor 720. For each of LEDs 712, there is a thermal pad 730 between the LED and the heat conductor 720. The thermal pad may contain copper. In one embodiment, there is an individual thermal pad beneath each LED. In another embodiment, one or more LEDs may share one thermal pad. The LED is thermally coupled to the thermal pad 730 and then the thermal pad 730 is thermally coupled to the heat conductor 720. In one embodiment, the LED is thermally coupled by means of solder or oriented carbon fiber film. The heat conductor may be a coin-shaped article made of copper. Thus, most heat generated by the LEDs 712 is transferred to the heat conductor 720 with very little heat resistance. The heat conductor may connect to another heat sink to further dissipate the heat. A flexible printed circuit 740 is designed to electrically connect to all the LEDs 712 of the array 710 via their electrical contacts. A flexible printed circuit is a patterned arrangement of printed wiring utilizing flexible base material with or without flexible cover layers. The flexible printed circuit uses flexible base material so that mechanical stress due to the thermal expansion and contraction is minimized and cracking is prevented. The apparatus has superior thermal dissipation ability because the heat generated by the LEDs 712 flows through a thermal channel of the thermal pad 730 and the heat conductor 720 with minimum thermal resistance. Therefore, it is possible to arrange the LEDs 712 in close proximity while not overheating the LEDs. The LEDs 712 may be arranged with an average spacing between the neighboring LEDs of less than 4 millimeters, preferably less than 3 millimeters. As shown in FIG. 7, the LED array 710 forms a planar Lambertian disc with a diameter of from about 10 millimeters to about 18 millimeters. The light intensity from the planar Lambertian disc to an observer is the same regardless of the observer's angle of view. The design is a lighting solution with low cost, high efficacy and reliability. The product life may exceed 50,000 hours.

Figure 8:
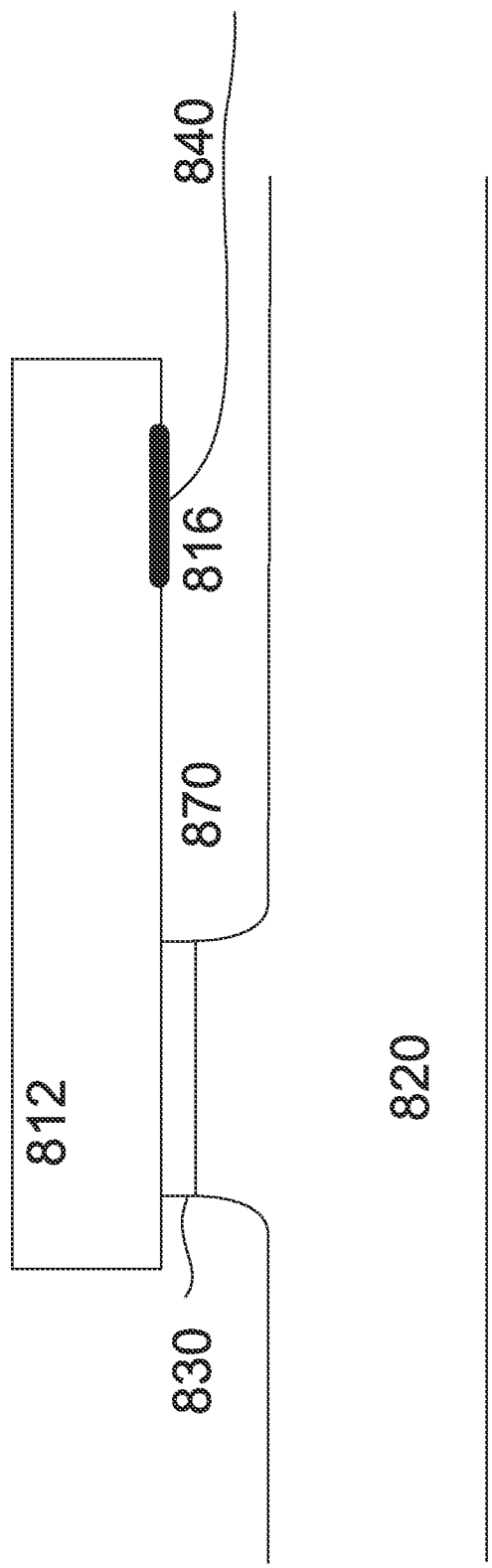
FIG. 8 shows a cross sectional view of one LED within the array and components beneath the LED.

FIG. 8 shows a cross sectional view of one LED within the array and the components beneath the LED. The LED 812 is mounted on a heat conductor 820 via a thermal pad 830. The LED 812 may be an LED package including a ceramic base. The thermal couplings between the LED 812 and thermal pad 830, and between the thermal pad 830 and heat conductor 820, have minimum thermal resistance. A major portion of the heat generated by the LED 812 is transferred to the heat conductor 820 through the highly efficient thermal channel. In one embodiment, all LEDs within the LED array are mounted on the same heat conductor via thermal pads. The heat conductor may be mounted on another heat sink to further dissipate the heat. In one embodiment, the heat sink may be mounted to the heat conductor by a screw on the bottom. In another embodiment, the heat sink may be mounted by screwing the heat sink onto two ears of the heat conductor. In yet another embodiment, the heat sink may be mounted by spring steel clips that are analogous to heat sink block clips for computer CPU chips. The heat sink applies constant spring pressure between the heat conductor and head sink independent of time, temperature and cycling. The LED 812 has one or more electrical contacts 816. In one embodiment, the electric contacts 816 are wire bonds contacts. In another embodiment, the electric contacts 816 are polyamide holt-melt matrix film (Nickel fiber) that can be applied by pressure and heat. The film forms an electrical contact between the LED and contacts pads of a flex printed circuit. The flexible printed circuit 840 is electrically connected to the electrical contacts 816 to supply and fine-tune electric power for the LED 812. Light characteristics such as color rendering index (CRI) and correlated color temperature (CCT) can be adjusted by tuning the intensities of the LEDs within the array. The flexible base material in the flexible printed circuit 840 prevents cracking of ceramic bases of the LED packages due to the thermal expansion and contraction. As shown in FIG. 8, there is spacing 870 between the LED 812 and the heat conductor 820. In one embodiment, epoxy resin can be capillary backfilled in the spacing 870. As a result, the LED electrical contacts 816 is further isolated for high-voltage tracking with the thermal pad 830. The epoxy resin may be precision backfilled by a jetting applier or a drop applier.

The LED array may contain LEDs with different emitting colors to achieve better color characteristics and enable color and/or CCT tuning. In one embodiment, the LED array includes one or more red-emitting LEDs, one or more blue-emitting LEDs, and one or more yellow-emitting LEDs. The yellow-emitting LED may have a blue LED die and a YAG:Ce phosphor, similar to what constructs a white-emitting LED, but with more YAG:Ce phosphor. In one embodiment, the extra YAG:Ce phosphor may be applied in a remote phosphor dome disposed over the existing white-emitting LED to form a yellow-emitting LED. The remote phosphor dome may be a hemispherical cap disposed over the LED encapsulation. In another embodiment, the extra YAG:Ce phosphor may be disposed directly within the LED packages.

In another embodiment, the LED array includes one or more red-emitting LEDs, one or more blue-emitting LEDs, one or more yellow-emitting LEDs, and one or more cyan-emitting LEDs. The cyan-emitting LED may have a blue LED die and a Ba:Si Oxynitride Eu-doped phosphor. In one embodiment, the Ba:Si Oxynitride Eu-doped phosphor may also be disposed via a remote phosphor dome as discussed in the previous paragraph. In another embodiment, the Ba:Si Oxynitride Eu-doped phosphor may be disposed directly within the LED packages. The LED array with mixing color LEDs may achieve a wide range of correlated color temperatures (CCTs), such as from 1800 to 7000 Kelvin, while maintaining a high color rendering index (CRI) of more than 90, or even 95. The solution enables color tuning by changing the numbers of different color LEDs. Furthermore, the solution eliminates the need of white LED binning, since the color shifting is compensated by the mixing of the different color LEDs. By controlling the throttling of different color LEDs, a high CRI spectrum is rebuilt by utilizing high production volume, low cost, reliable LEDs.

Figure 9A:
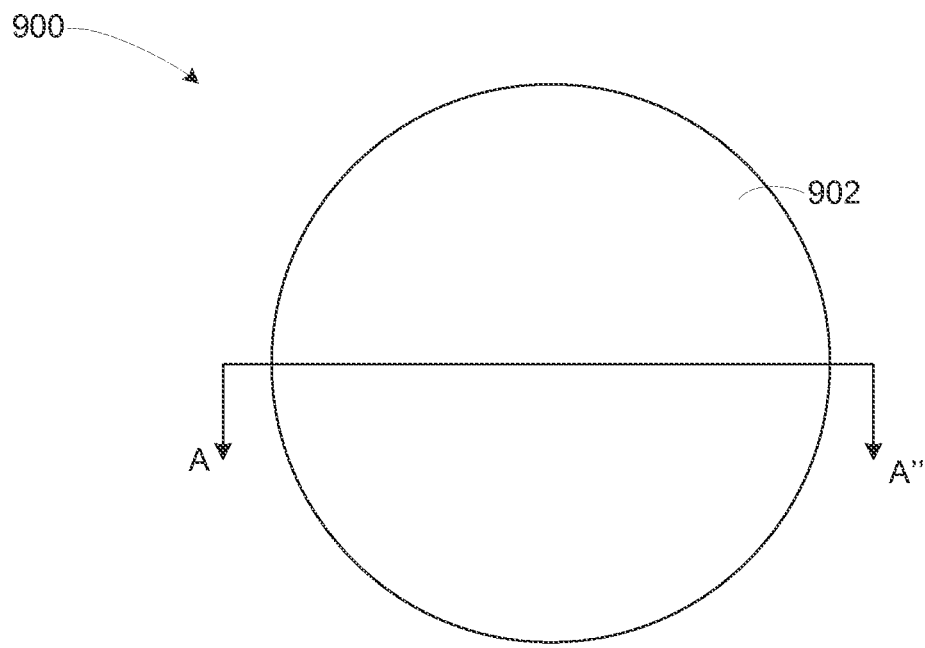
FIG. 9A illustrates a top view of a point light source.

FIG. 9A illustrates a top view of a point light source 900. The point light source 900 can emulate an incandescent lamp with a broad beam angle that is color tunable. The point light source 900 is a portable lighting unit that can be plugged into a lamp device. The point light source 900 can derive electric power in the form of driving current signals from the lamp device. The point light source 900 provides light substantially as a single point of light. The point light source 900 includes a light source window 902. The light source window 902 can be a diffuser window. The light source window 902 is shown to be circular. However, it is understood that the light source window 902 can also be rectangular, elliptical, or any other shapes.

Figure 9B:
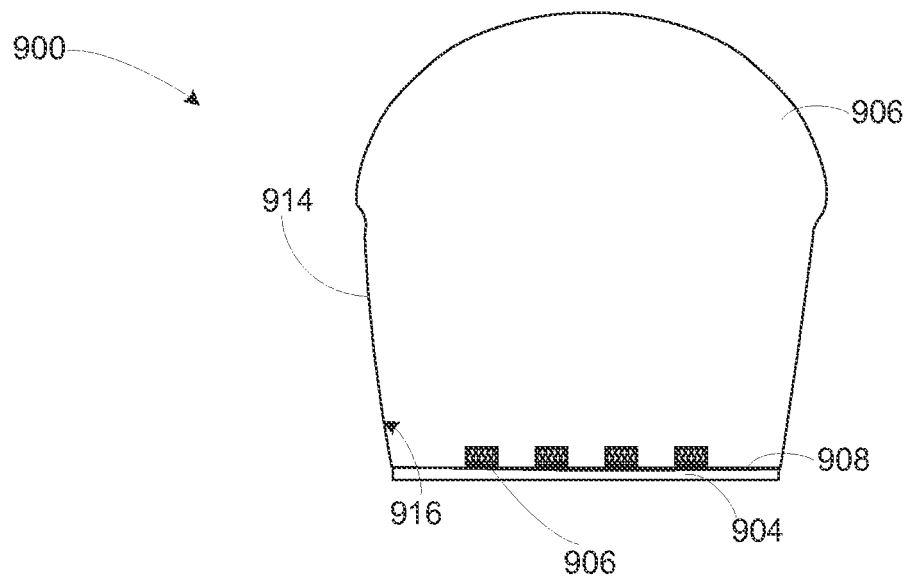
FIG. 9B illustrates an example cross-section of the point light source along the line A-A".

FIG. 9B illustrates an example cross-section of the point light source 900 along the line A-A" of FIG. 9A. The point light source 900 includes a substrate 904. The substrate 904 is a solid layer of material, such as a circuit board, for hosting an electronic circuitry 908. The point light source 900 includes an LED array 906 attached to the substrate 904 and electrically connected to the electronic circuitry 908 on the substrate 904. The electronic circuitry can be coupled to a power and signal interface with a lamp device when the point light source 900 is plugged into the lamp device. The LED array 906, such as the LED array 110 of FIG. 1, emits light at two or more different wavelength bands. Optionally, the electronic circuitry 908 can include a memory unit for storing a color model of the LED array 906. The color model can define the driving signal necessary to produce different color spectra at different temperatures and power supply settings. Also optionally, the electronic circuitry 908 can be coupled to a sensor unit within the point light source 900 for detecting the color spectrum produced by the LED array 906 within the point light source 900. For example, the sensor unit can be attached to the substrate 904 adjacent to the LED array 906. The electronic circuitry 908 and the side of the substrate 904 facing the LED array 906 can be optionally coated with a reflective coating. For example, the substrate 904 can be an AlN (Aluminum Nitride) board with silver and SiO2 protective overcoat over the substrate 904 except where the electrical contact pads are underneath the LED array 906.

The LED array 906 can, for example, be organized in a circular fashion. The LED array 906 can be organized to minimize the distance between the LEDs for both spaces saving and better mixing of the colors. A mixer wall 914 can be placed around the LED array 906. The mixer wall 914, for example, can be the mixing barrel sections 112 and 114 of FIG. 1, the mixing barrel sections of FIG. 2A and FIG. 2B, the mixing barrel section 310 and 311 of FIG. 3, the mixing barrel sections 410 and 411 of FIG. 4, or the mixing barrel 510 of FIG. 5. The mixer wall 914 can include an aperture that is conformal around the LED array 906. The internal linings of the mixer wall 914 facing the LED array 906 can be reflective. For example, the internal side of the mixer wall 914 can include a reflective coating 916, such as a silver coat. The reflective coating 916 can reflect a large percentage light rays, such as 98% reflectivity or above.

Figure 10A:
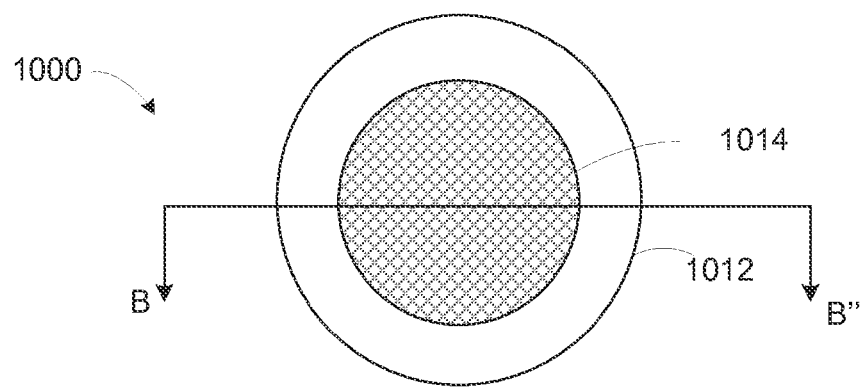
FIG. 10A illustrates a top view of a point light source in another embodiment.

FIG. 10A illustrates a top view of a point light source 1000 in another embodiment. The top view of the point light source 1000 illustrates a mixer wall 1012 around a diffuser window 1014 that emits color tunable diffused lighting with a broad beam spread.

Figure 10B:
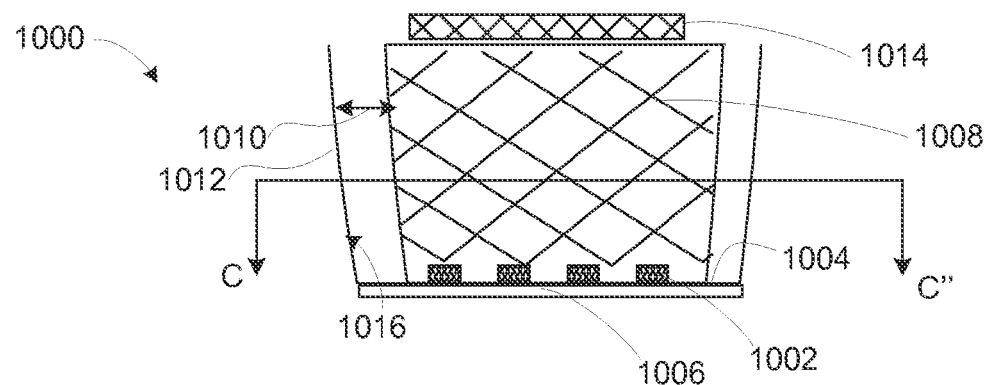
FIG. 10B illustrates an example cross-section of the point light source along the line B-B".

FIG. 10B illustrates an example cross-section of the point light source 1000 along line B-B" of FIG. 10A. The point light source 1000 can emulate a spot light lamp with a narrow beam spread from an LED array 1002 that is color tunable. The point light source 1000 includes the LED array 1002 coupled to an electronic circuitry 1004 on a substrate 1006. The LED array 1002 can be the LED array 906 of FIG. 9B. The electronic circuitry 1004 and the substrate 1006 can respectively be the electronic circuitry 908 and the substrate 904 of FIG. 9B. The point light source 1000 includes a light mixing pipe 1008 over the LED array 1002. The light mixing pipe 1008 can be the refractive block described above. The light mixing pipe 1008 can be in direct contact with the LED array 1002. The light mixing pipe 1008 is a solid light piping media that allows for total internal reflection (TIR) for light rays emitted from the LED array 1002. The light mixing pipe 1008 can be surrounded by an air gap 1010 apart from the mixer wall 1012. The mixer wall 1012 can be the mixer wall 914 of FIG. 9B. The mixer wall 1012 can provide a reflective surface.

Optionally, a diffuser window 1014 can be coupled to the light mixing pipe 1008 on the opposite end of the light mixing pipe 1008 away from the LED array 1002. The diffuser window may be a light extraction surface. The light extraction surface may be textured or smooth. The diffuser window 1014 can be optically bonded to the light mixing pipe 1008 as shown in FIG. 10B. Alternatively, the diffuser window 1014 can be separated from the light mixing pipe 1008 with an air gap similar to the light source window 902 of FIG. 9B and attached to the light source 1000, such as by a clipping mechanism. In one example, the diffuser window is integral to the top surface of the light mixing pipe 1008. A photoresist patterned with a laser can be placed on the top surface. The pattern can be selected for optical light diffusion properties. The top surface can then be coated with an electroless nickel that develops into a shin that serves as the diffuser window 1014.

The light mixing pipe 1008 can substantially provide TIR when light rays intersect with the external walls of the light mixing pipe 1008 at a TIR angle. However, some back scattering from the diffuser window 1014 may cost a small portion of light rays to exit out of the light mixing pipe 1008. In those cases, the mixer wall 1012 provides a reflective coating 1016, similar to the reflective coating 916, to reflect the escaped light rays back into the light mixing pipe 1008.

The point light source 1000 can trade off beam spread with aperture size. The point light source 1000 can achieve a wider beam spread by having a smaller exit aperture size. Alternatively, the point light source 1000 can achieve a narrow beam spread by having a larger aperture size. The exiting window aperture size can be changed based on the size of the diffuser window 1014 and the mixer wall 1012. The mixer wall 1012 can be structured as an inverted column that funnels down the light generated from the LED array 1002 into a smaller exit aperture to produce a point light source with a broad beam spread.

Figure 10C:
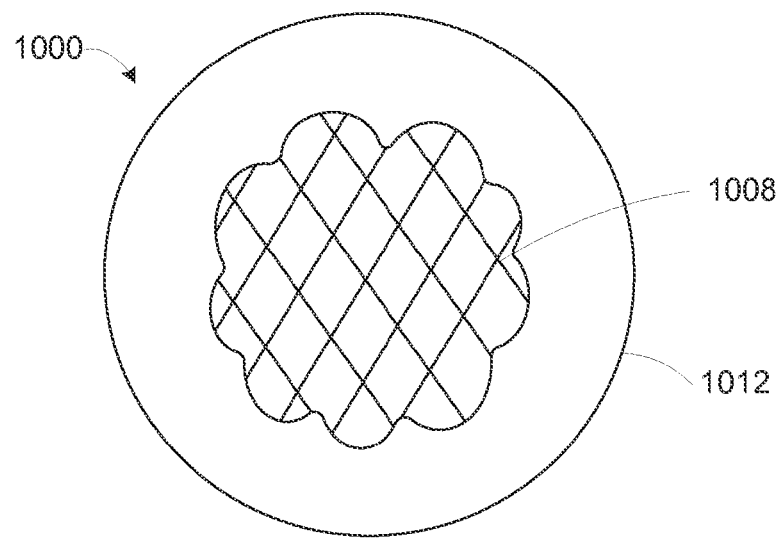
FIG. 10C illustrates an example cross-section of the collimated light source along the line C-C".

FIG. 10C illustrates an example cross-section of the point light source 1000 along the line C-C" of FIG. 10B. The cross-section illustrates the mixer wall 1012 surrounding the light mixing pipe 1008. The light mixing pipe 1008, while straight along a vertical axis from the LED array 1002 to the diffuser window 1014, is patterned with non-straight edge(s) perpendicular to the vertical axis. For example, the light mixing pipe 1008 can have a straight vertical edge or vertical edges, but is patterned with curved ripples perpendicular to the vertical axis. This setup ensures mixing of the light rays as the light traverses upward through the light mixing pipe 1008 while preventing back scattering that interfere with the total internal reflection through the light mixing pipe 1008. The patterning on the light mixing pipe 1008 can encourage mixing such that there are no dominant wave fronts and such that the source patterning of the LED array 1002 is reduced.

Figure 10D:
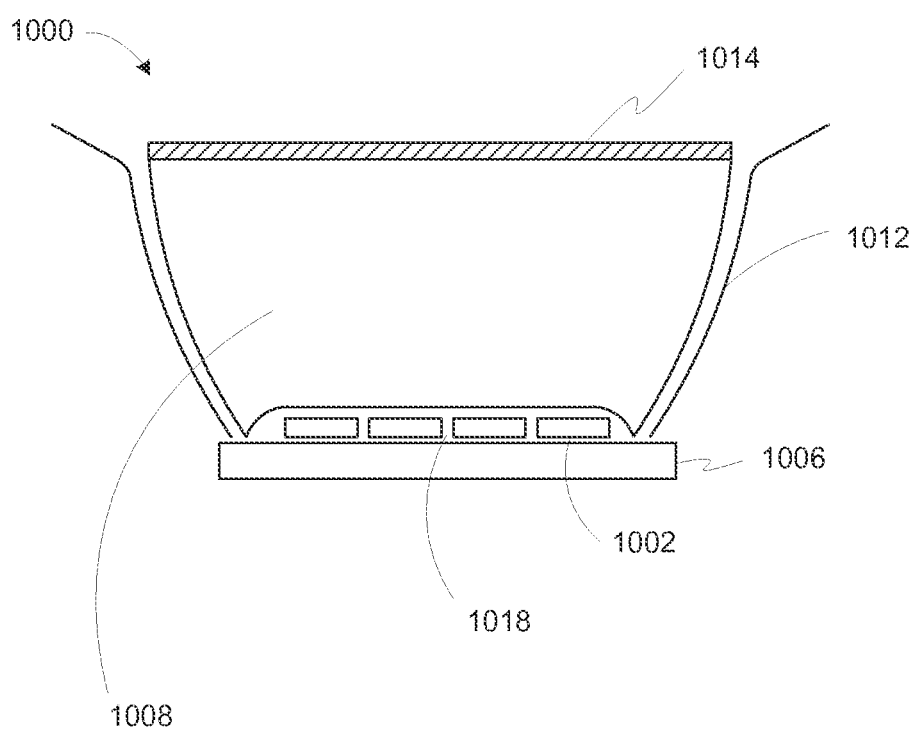
FIG. 10D illustrates an example cross-section of the collimated light source along the line B-B" with optional components.

FIG. 10D illustrates an example cross-section of the light source 1000 along the line B-B" with optional components. The light source 1000 includes optionally a silicon gel 1018 to improve optical coupling with the light mixing pipe 1008. As illustrated, the silicon gel 1018 is placed over the LED array 1002. The light mixing pipe 1008 can be made of glass, such as BK7 glass, acrylic, polymer, such as Zeonex 350R, silicone, or glass with silicone overmolded. The light mixing pipe 1008 may include a parabolic collimating region 1020 around the LED array 1002. The mixer wall 1012 may be tuned for exit beam distribution, such as the circumferential waviness similar to the profile of the light mixing pipe 1008 in FIG. 10C. The diffuser window 1014 may be textured or smooth. The diffuser window 1014 may be based on depositing of cloudy resin, an optical silicone, or a texturing of the light mixing pipe 1008.

Figure 11A:
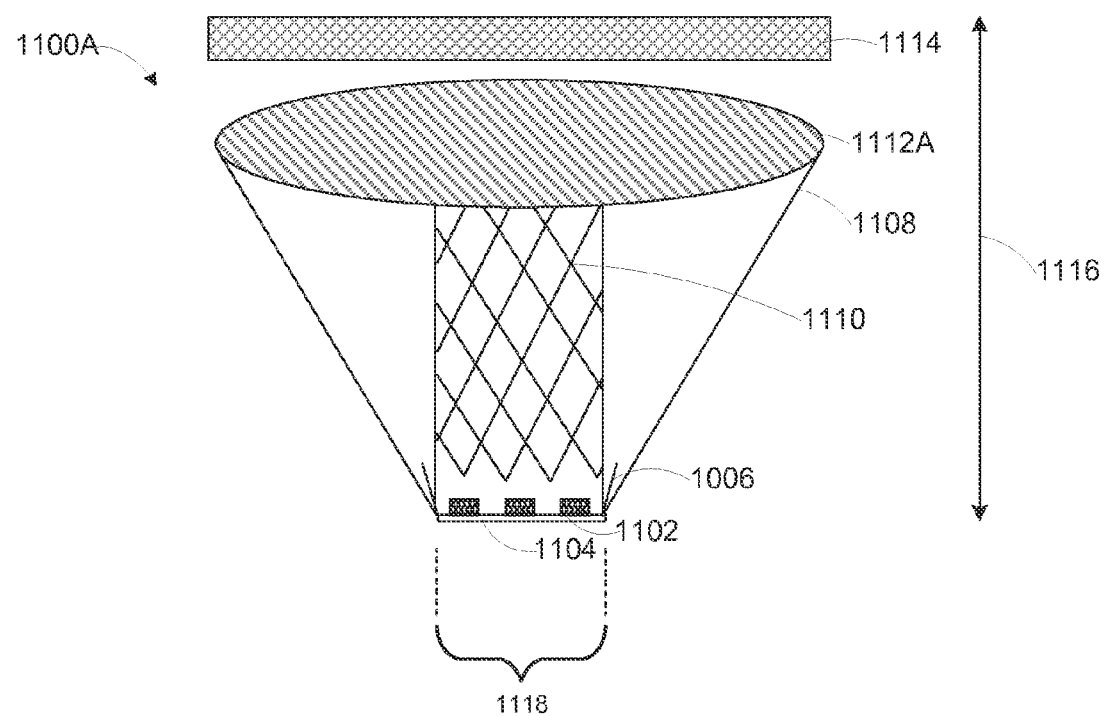
FIG. 11A illustrates an example cross-section of a collimated point source.

FIG. 11A illustrates an example cross-section of a collimated point source 1100A. The collimated point source 1100A can be a modification of the point light source 900 or the point light source 1000. The top view of the collimated point source 1100A is similar to FIG. 9A or FIG. 10A. The example cross-section is taken as a vertical cross-section through the top of the collimated point source 1100A in the same manner as illustrated by the cross-sections of FIG. 9B and FIG. 10B.

The collimated point source 1100A includes an LED array 1102 on a substrate 1104. The LED array 1102 can be similar to the LED array 906 or the LED array 1002. The substrate 1104 (electronic circuitry not shown for illustrative purposes) can be similar to the substrate 904 or the substrate 1006. Conformal around the LED array 1102 is a low angle reflective wall 1106. A mixer wall 1108 with a reflective surface can surround the LED array 1102 extending away from the LED array 1102 and the substrate 1104 in an expanding cone shape. Coupled to the LED array 1102 is a light mixing pipe 1110. The light mixing pipe 1110 can be similar to the light mixing pipe 1008 of FIG. 10B. The light mixing pipe 1110 allows substantial total internal reflection when light rays intersect an external surface of the light mixing pipe 1110 below a maximum angle from the external surface. The low angle reflective wall 1106 ensures that any escaped light rays returns to the light mixing pipe 1110 below the maximum angle to ensure TIR. The cross-section of the light mixing pipe 1110 can be rippled patterned in the same manner as the light mixing pipe 1008 is illustrated in FIG. 10C.

Sitting on top of the light mixing pipe 1110 is a collimator 1112A. The mixer wall 1108 can provide support for the collimating exist surface 1112A. The collimator 1112A folds angled light rays traveling up the light mixing pipe 1110 to become collimated as it exits away from the collimator 1112A. In some embodiments, a diffuser window 1114 can be placed over the collimator 1112A. The diffuser window 1114 can be optically bonded to the collimator 1112A or be attached to the collimator 1112A with an air gap therebetween. The collimator 1112A can be support Fresnel optics over the collimator 1112A. The selection of the collimator 1112A determines the beam angle. Hence, the collimator 1112A coupled to the light mixing pipe 1110 enables a light source that can tune its beam angle without having to change the underlying lamp. It has been discovered that a profile height 1116 of the collimated light source 1100A can be minimal by use of the collimator 1112A. A source area 1118 of the LED array 906 is also minimized allowing for optimal mixing of the source patterns.

Figure 11B:
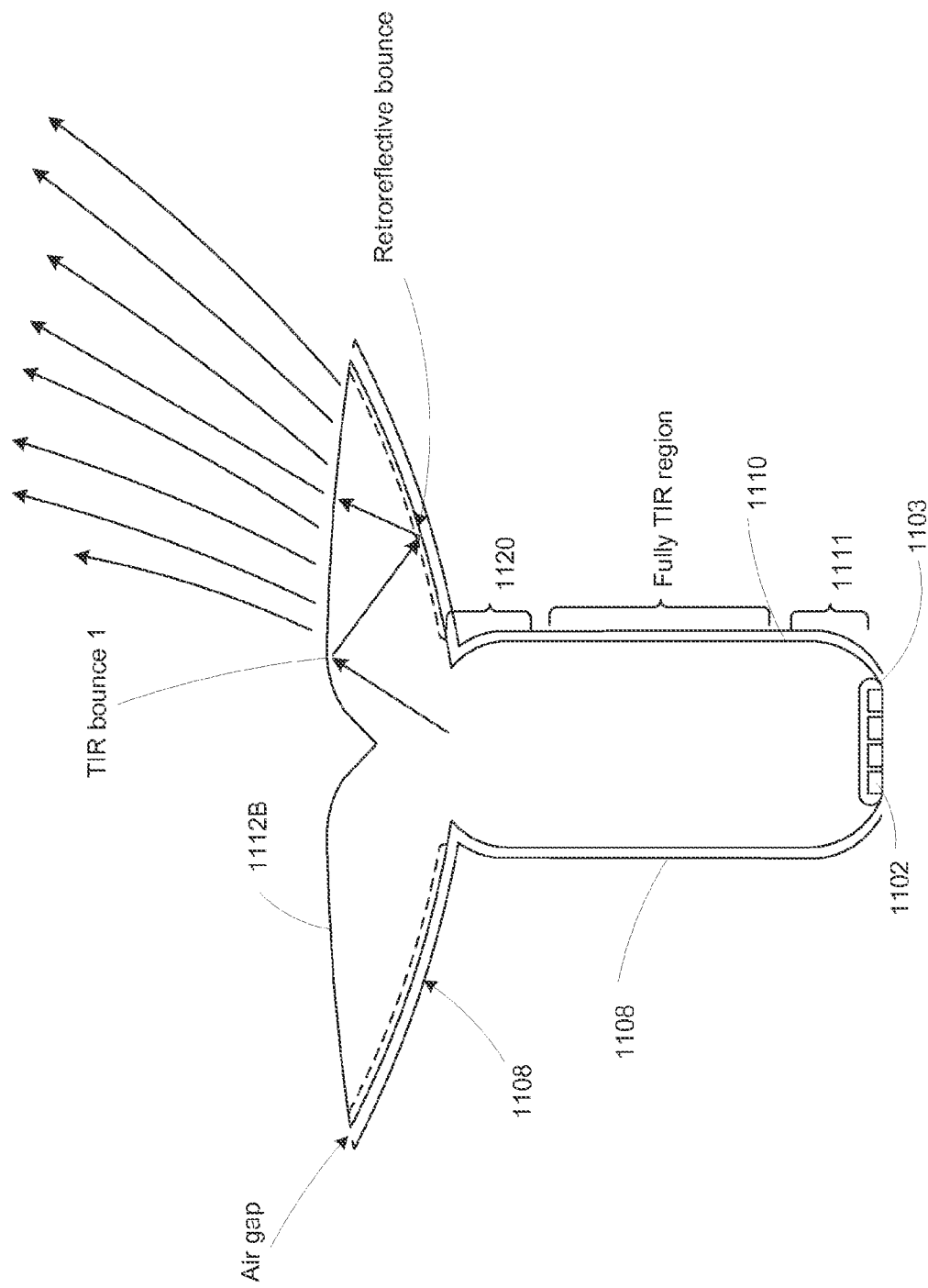
FIG. 11B illustrates another example cross-section of a collimated point source.

FIG. 11B illustrates another example cross-section of a collimated point source 1100B. The collimated point source 1100B includes the LED array 1102. Optionally over the LED array 1102 is an optical silicone 1103. The light mixing pipe 1110 sits over the LED array 1102, such as attached to the optical silicone 1103. Light mixing pipe 1110, optionally, has a collimating region 1111. The collimating region 1111 is similar to the collimating region 1020 with a parabolic shaped over the LED array 1102 to improve the efficiency of total internal reflection from the LED array 1102.

Separated by an air gap from the light mixing pipe 1110 is the mixer wall 1108 with the reflective inner surface. The mixer wall 1108 can be sheet metal, glass, plastic, or any other material with a reflective inner surface. Both the light mixing pipe 1110 and the mixer wall 1108 can optionally maintain a throat region 1120. Light rays exiting the throat region 1120 enters a collimator 1112B. The collimator 1112B can be a retro reflective lens with a convex vortex groove in the center of a surface facing away from the light mixing pipe 1110. The collimator 1112B narrows the beam of light exiting the collimator 1112B by retro-reflective bounces. The mixer wall 1108 can extend beneath the collimator 1112B to prevent any back scattering light rays from exiting beneath the collimator 1112B towards the light mixing pipe 1110. The collimator 1112 B may optionally have reflective coating on the side facing towards the substrate 1104 to ensure that light rays exit the collimator 1112B in the intended direction of the collimated light source 1100.

Figure 11C:
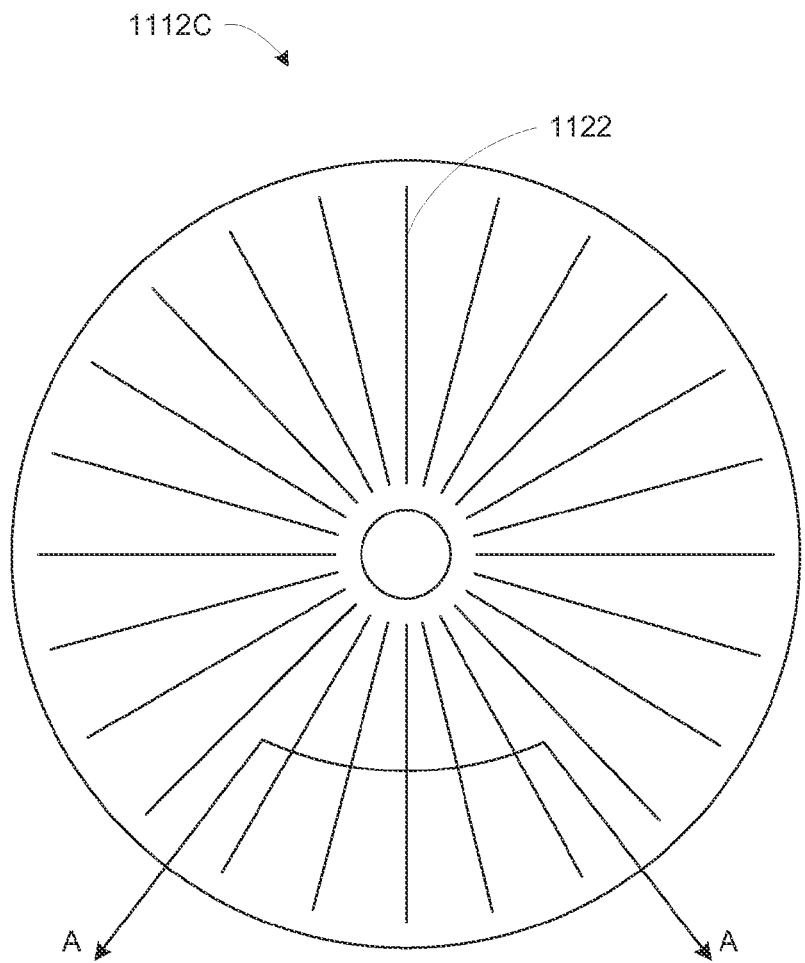
FIG. 11C illustrates a bottom view of a collimator.

FIG. 11C illustrates a bottom view of a collimator 1112C. The collimator 1112C can be the collimator 1112A or the collimator 1112B. The collimator 1112C has a radially patterned bottom surface with grooves 1122 each extending from a center of the collimator 1112C outwards. For example the grooves 1122 can be straight triangular prism ditches. The grooves 1122 may be manufactured by molding the collimator 1112C or silicone overmolding.

Figure 11D:
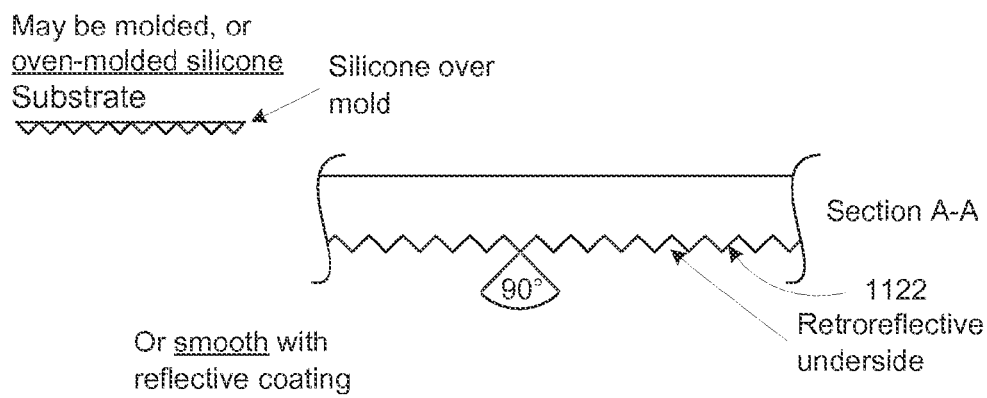
FIG. 11D illustrates a cross-section of the collimator along the curve line A-A in FIG. 11C.

FIG. 11D illustrates a cross-section of the collimator 1112C along the curved line A-A. The grooves 1120 can be at substantially 45 degrees angle with respect to a plane of the substrate 1104. That is the grooves 1120 may have a 90 degrees inner groove angle.

Figure 11E:
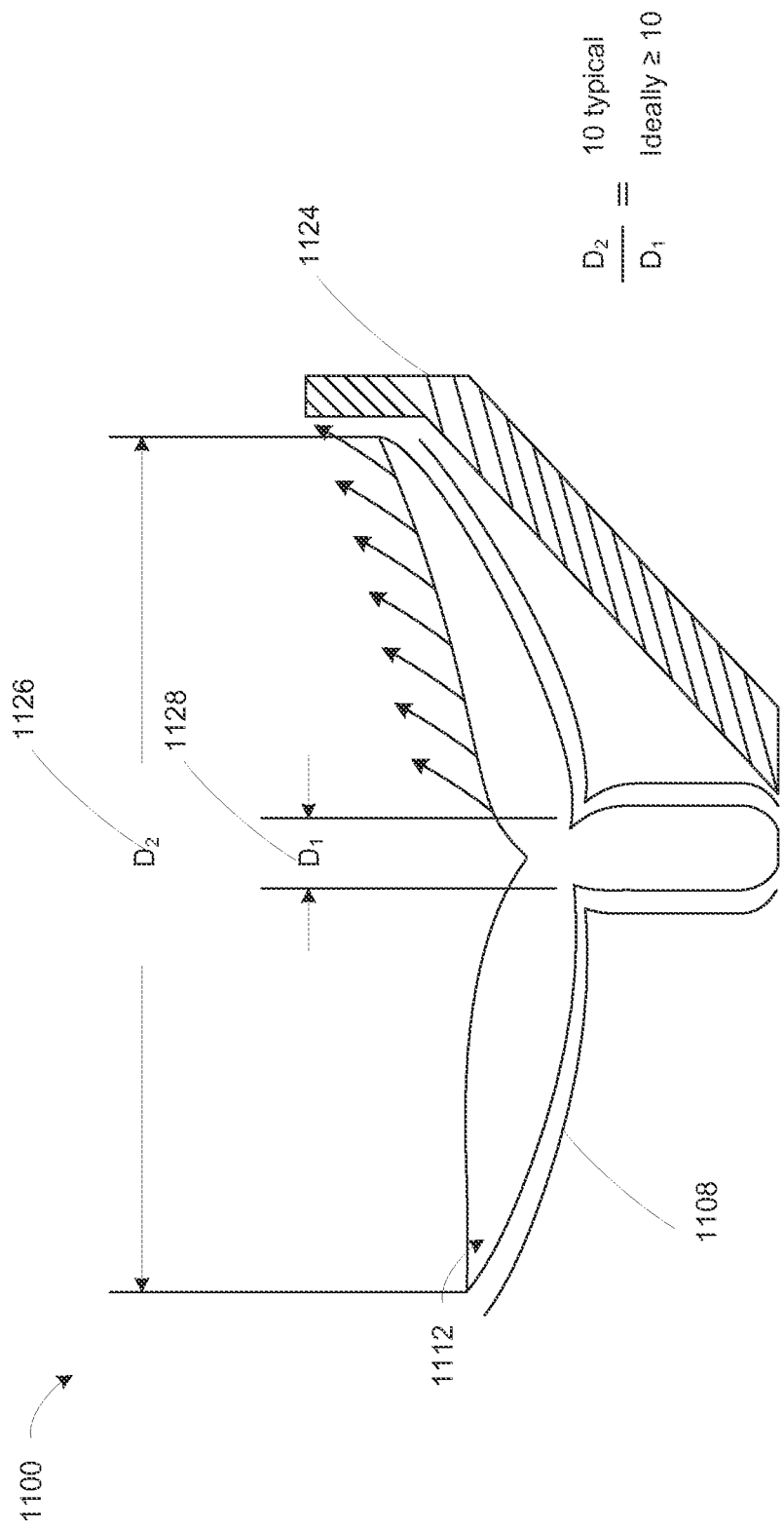
FIG. 11E illustrates an example cross-section of the collimated point source with a support structure.

FIG. 11E illustrates another example cross-section of the collimated point source 1100 with a support structure 1124. The support structure 1124 surrounds the mixer wall 1108 and the collimator 1112A, 1112B, or 1112C. The support structure 1124 provides physical support to the rest of the collimated light source 1100. The support structure 1124 can protrude slightly above the collimator 1112A/1112B/1112C. An outer diameter 1126 of the collimator 1112A/1112B/1112C over a throat diameter 1128 of the throat region 1120 is ideally equal to or greater than 10.

Figure 11F:
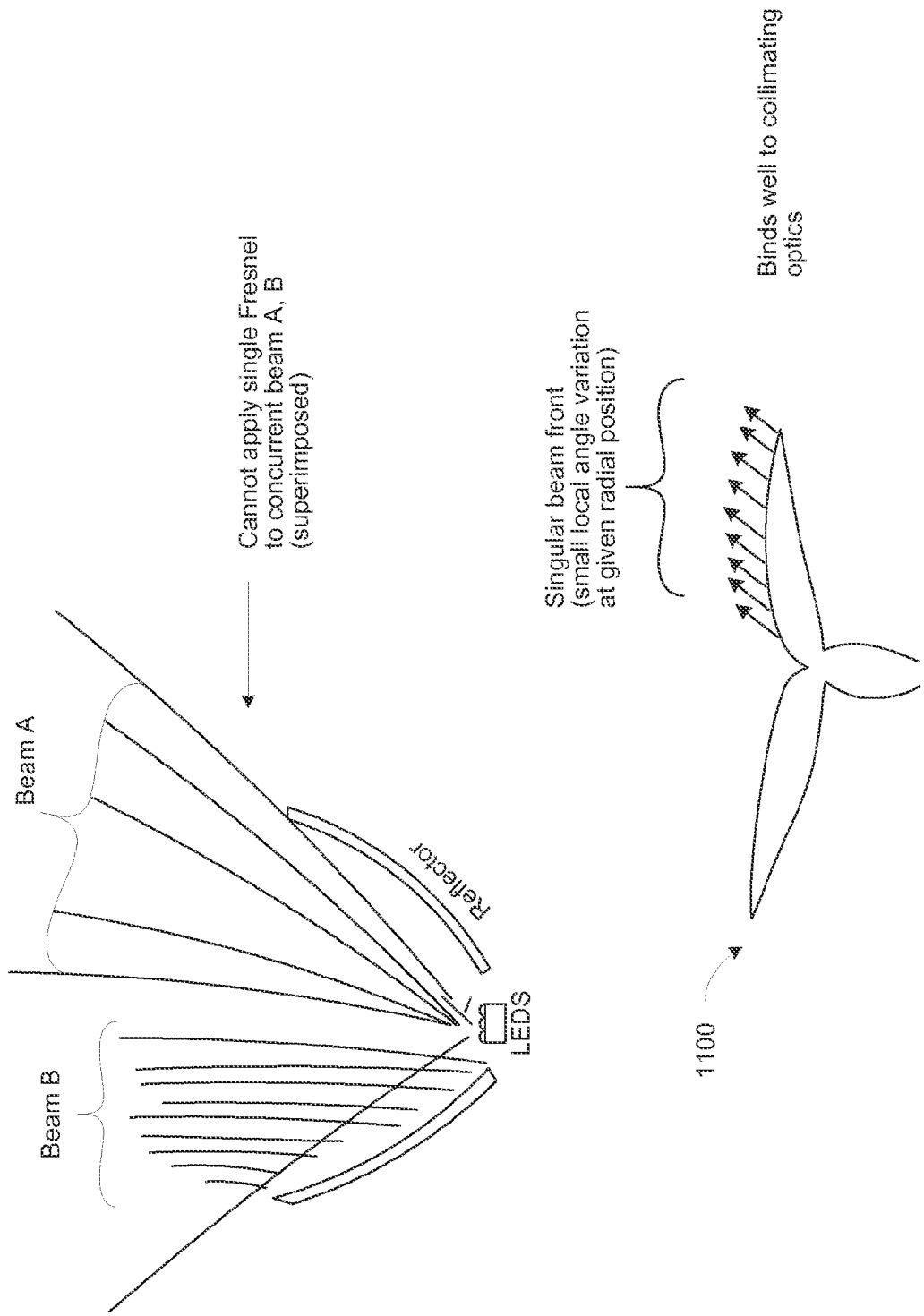
FIG. 11F illustrates light rays exiting the collimated point source.

FIG. 11F illustrates light rays exiting the collimated point source 1110. Light rays exiting the collimated point source 1100 has a singular beam front with small local angle variation at any given radial position. Conventional floodlight parabolic reflectors around a light source to collimate beams create a superposition of collimated beams from the reflector and angle beams from the light source. Unlike the conventional floodlight reflectors, the light rays exiting the collimated point source 1110 has uniform beam angle for further collimation.

Figure 11G:
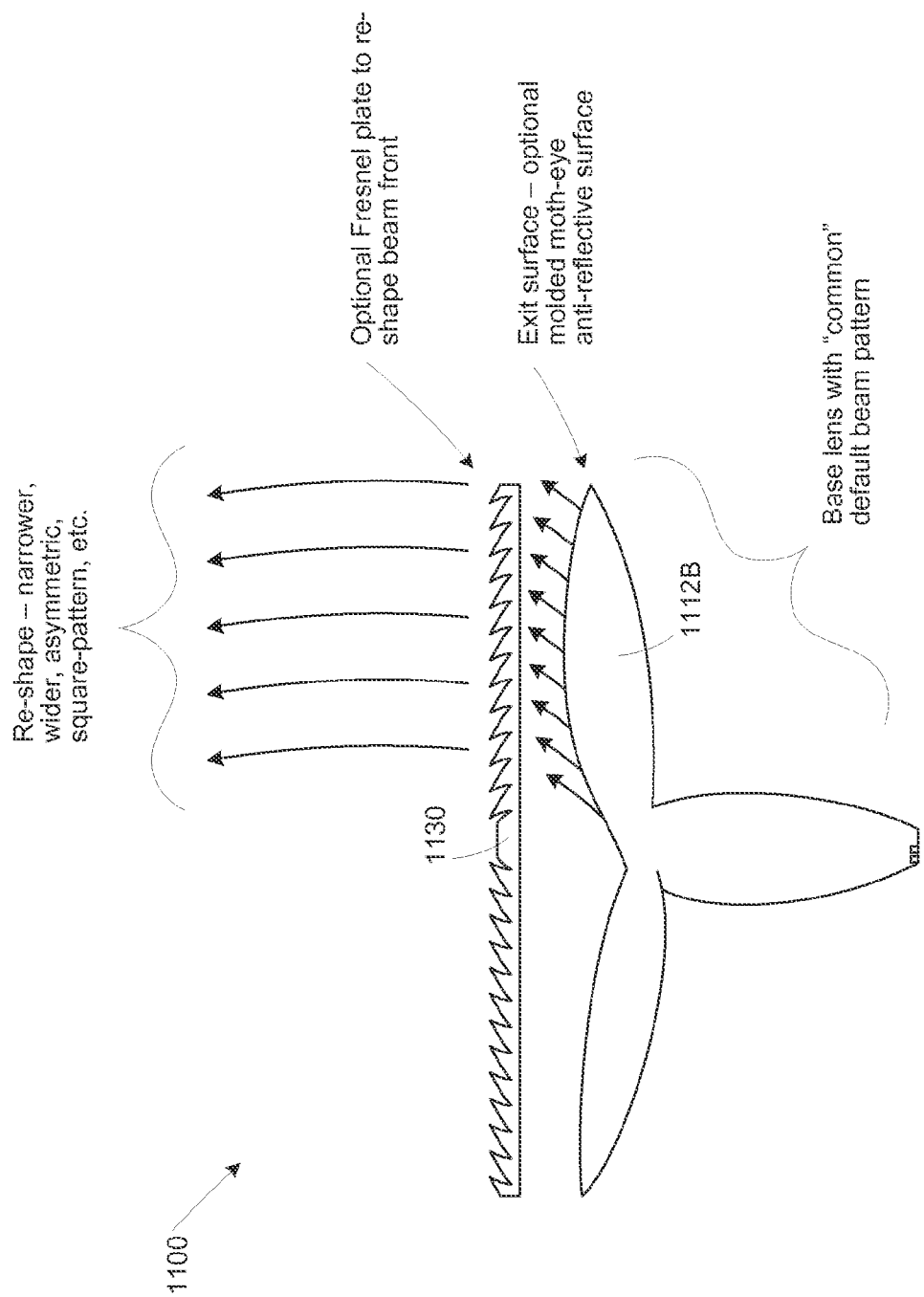
FIG. 11G illustrates a cross-sectional view of the collimated point source with optional exit interfaces.

FIG. 11G illustrates a cross-sectional view of the collimated point source 1110 with optional exit interfaces. The optional exit interfaces can be modular attachments to the collimated point source 1110. For example an optional exit interface can be the diffuser window 1114. The optional exit interface can also be a Fresnel plate 1130 as illustrated. Different embodiments of the Fresnel plate 1130 can create narrower or wider exit beams. The Fresnel plate 1130 can also create patterns of light such as asymmetric light, square patterned light, or other patterned light. The collimator 1112A/1112B/1112C may have an exit surface that is optionally molded with a moth eye anti-reflective surface. The moth eye surface can be a pattern of bumps, each roughly below a micron, such as around 200 nm high and spaced on 300 nm centers. The bumps are smaller than the wavelength of visible light, so the light sees the surface as having a continuous refractive index gradient between the air and the medium, which decreases reflection by effectively removing the air-lens interface. The bump protrusions with progressive index improve the efficiency of exiting collimated beams.

Figure 12A:
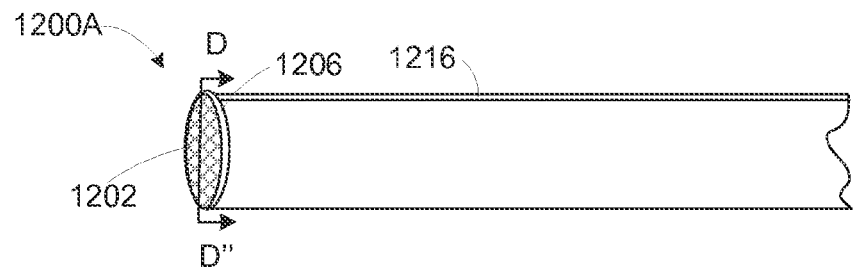
FIG. 12A illustrates an example of a perspective view of a linear light source.

FIG. 12A illustrates an example of a perspective view of a linear light source 1200A. The linear light source 1200A is a one-dimensional light source that illuminates along a line. The linear light source 1200A can be rigid along the line or be flexible. An electronic circuitry 1202 exists on one end of the linear light source 1200A. The electronic circuitry 1202 can be coupled to an LED array (shown in FIG. 12B) to provide power and signal for driving the LED array. The electronic circuitry 1202 can be the electronic circuitry 908 or the electronic circuitry 1004 as illustrated above. Optionally, a substrate can be used to support the electronic circuitry 1202.

Figure 12B:
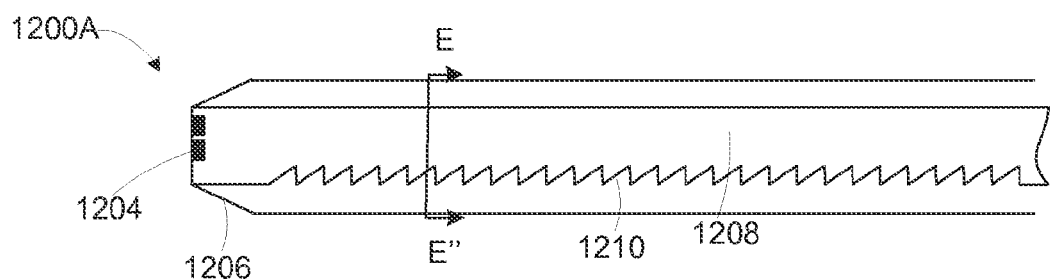
FIG. 12B illustrates an example cross-section of the linear light source along line D-D".

FIG. 12B illustrates an example cross-section of the linear light source 1200A along line D-D" of FIG. 12A. The linear light source 1200A includes an LED array 1204 on one end of the linear light source 1200A. The LED array 1204 is coupled to the electronic circuitry 1202 for providing power and driving signals to color tune the LED array 1204. A throat region 1206 surrounds the LED array 1204. The throat region 1206 sets the beam angle of light rays running down a light mixing pipe 1208. The light mixing pipe 1208 can be made of the same material as the light mixing pipe 1008 or the light mixing pipe 1110 previously described. The light mixing pipe 1208 includes a plurality of cut outs 1210. The cut outs 1210 can be air cavities. The cut outs 1210 can be shaped as triangular wedges. Each of the cut outs 1210 can have a 45 degree angle interface with the light mixing pipe 1208 with respect to the pipe axis of the light mixing pipe 1208.

Figure 12C:
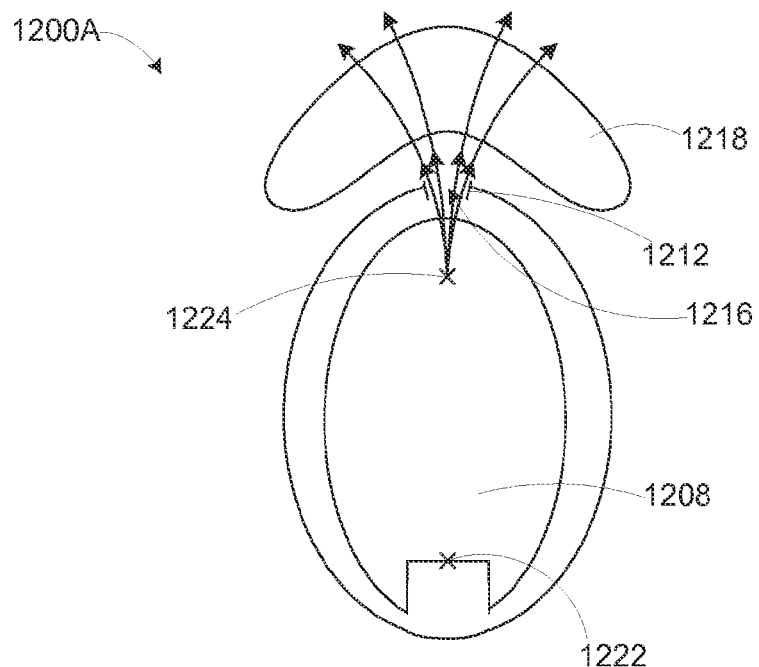
FIG. 12C illustrates an example cross-section of the linear light source along line E-E".

FIG. 12C illustrates an example cross-section of the linear light source 1200A along line E-E" of FIG. 12B. The cross section illustrates an elliptical shape of the light mixing pipe 1208. In a preferred embodiment, the elliptical shape is at least two times as long as it is wide. The interface between each of the cut outs 1210 into the light mixing pipe 1208 acts as a first focal point 1222 of the elliptical shape. Light rays that scatter off of the cut outs 1210 scatter all around the light mixing pipe 1208 and end up folding back on a second focal point 1224 of the elliptical shape. Above and near the second focal point is a reflective wall 1212, similar to the mixer wall 1012 or the mixer wall 1108, with an exit aperture 1216. The focused light rays from the second focal point 1224 instead of reflecting back would exit the exit aperture 1216. The exit aperture 1216 allows light rays having scattered off of the cut outs 1210 to exit out along a line across from all of the cut outs 1210. For example, the light mixing pipe 1208 can be 12 millimeters wide. The exit aperture 1216 can be around 2 to 3 millimeters wide along the circumference of the light mixing pipe 1208 and extends lengthwise along the pipe axis of the light mixing pipe 1208. As a result, the linear light source 1200A provides an illumination along the exit aperture 1216 that extends along the length of the linear light source 1200A.

The illumination along the linear light source 1200A may have a narrow beam spread. Optionally, special lens 1218 can be attached over and along the exit aperture 1216 to make the beam spread more uniform or to change the beam spread. The special lens 1218 can be a linear refractive collimating lens. The special lens 1218 can have a concave side facing the exit aperture 1216 and a convex side away from the light mixing pipe 1208. The special lens 1218 can be in a wrapping shape around the light mixing pipe 1208 as illustrated. The special lens 1218 can ensure that the beam angle is wide along the pipe axis of the exit aperture 1216 but narrow along the circumference of the light mixing pipe 1208 or vice versa. Alternatively, the special lens 1218 is selected to provide a uniform illumination at different angles. For example, the special lens 1218 can fold light rays in a pattern such that more intensity is going towards higher angles and less intensity is going towards lower angles so that while having the same beam spread, the beam is uniform at all angles within the beam spread. Because without the special lens 1218 light flux would be centered near the lower angles, the patterning of the special lens 1218 can generate a uniform distribution of light intensity across different beam angles.

To control for even intensity along the pipe axis of the linear light source 1200A, one or both of the following methods can be employed. First, the size and/or density of the cut outs 1210 can be manipulated such that a cut out is made at a higher density from neighboring cut outs when the cut out is farther away from the LED array 1204. Further, a larger size of a cut out can be used when the cut out is the farther away from the LED array 1204. Second, the cross section area (i.e. the ellipse shape of FIG. 12C) of the light mixing pipe 1208 can be reduced when the cross-section is farther away from the LED array 1204. This tapering of the light mixing pipe 1208 maintains the flux density of the light rays along the pipe axis.

Figure 12D:
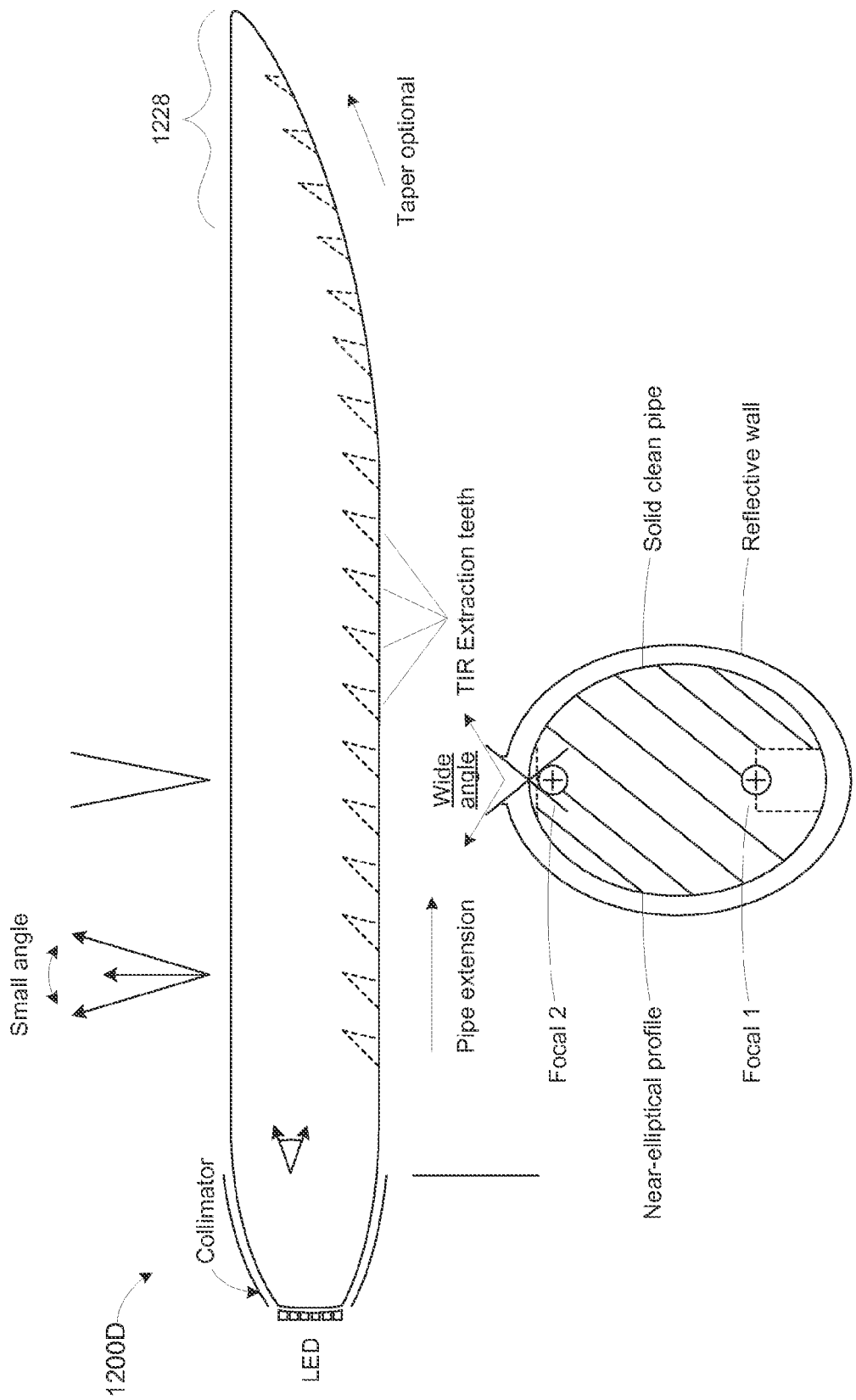
FIG. 12D illustrates an example cross-section of the linear light source with an optional tapered end.

FIG. 12D illustrates an example cross-section of a linear light source 1200D with an optional tapered end 1228.

Figure 13A:
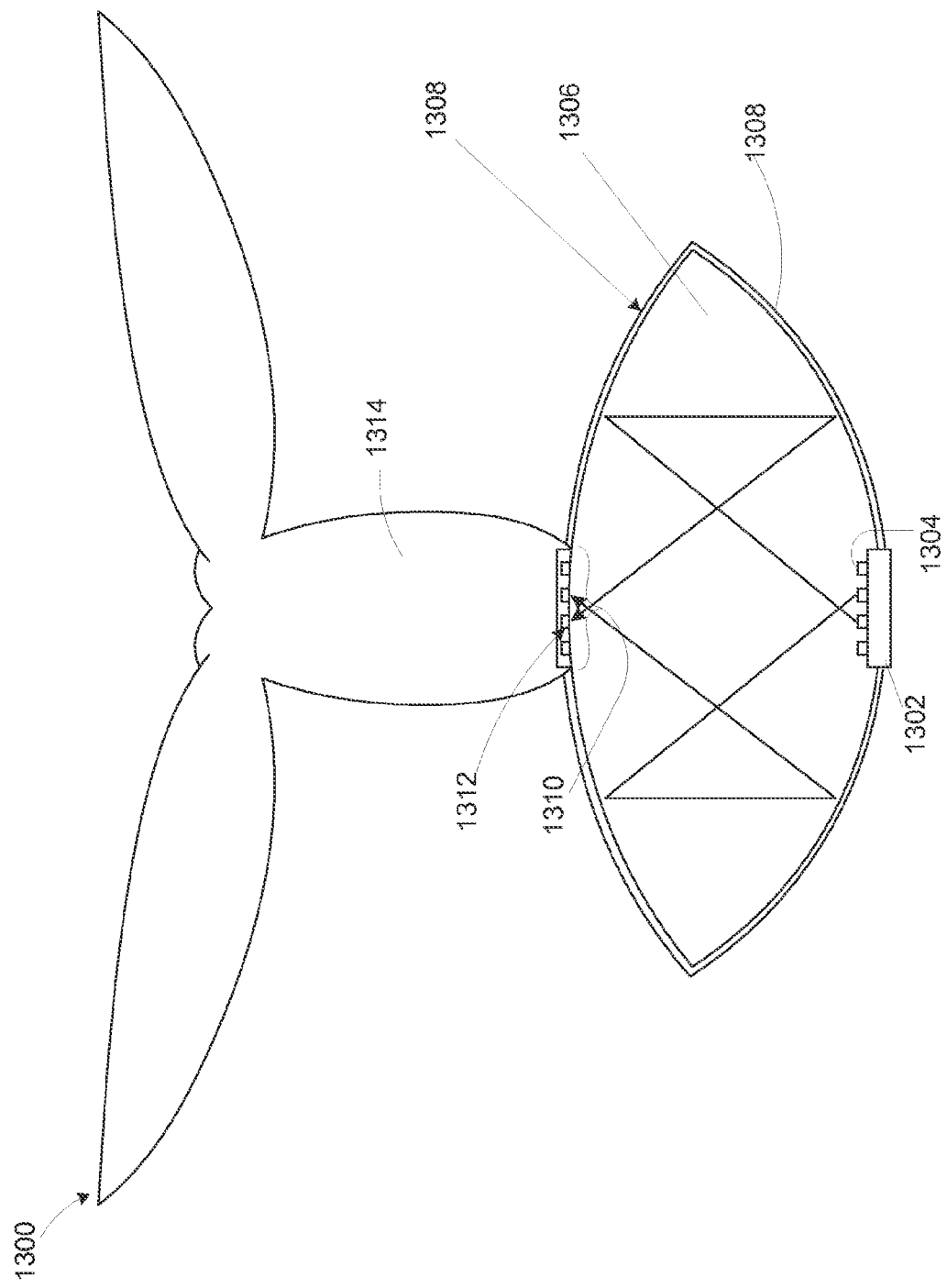
FIG. 13A illustrates a cross-sectional view of a remote phosphor light source.

FIG. 13A illustrates a cross-sectional view of a remote phosphor light source 1300. The remote phosphor light source 1300 includes a substrate 1302 with electronic circuitry to drive an LED array 1304 on the substrate 1302. The LED array 1304 can be an LED array of royal blue LEDs. Over the LED array 1304 is an imaging pipe 1306. The imaging pipe 1306 is a convex lens, such as a double convex lens. The imaging pipe 1306 can be made of solid glass. The imaging pipe 1306 can include a cup shaped pattern for collimating light emitted from the LED array 1304. The cup shaped pattern can be etched or coated on the imaging pipe 1306 directly. The imaging pipe 1306 can have a reflective surface 1308, such as a silver coating or micro radial retro-reflective grooves. The reflective surface 1308 has an opening 1310 across from where the imaging pipe 1306 is nearest to or in contact with the LED array 1304. Within the opening 1310 is a phosphor array 1312. The phosphor array 1312 includes multiple phosphor modules, such that when light rays from the LED array 1304 hits the phosphor modules at different colored light is emitted towards a light mixing pipe 1314. The light mixing pipe 1314 can be part of a point light source, such as the collimated point source 1100 (as illustrated) or a point light source 1000.

FIG. 13B illustrates light ray patterns within the remote phosphor light source 1300. The LED array 1304 of the remote phosphor light source 1300 amidst light rays into the imaging pipe. The light rays from a single LED 1320 converge on a radially mirrored opposite point across from the imaging pipe. At the convergence point is where a phosphor module 1322 is located.

Figure 14B:
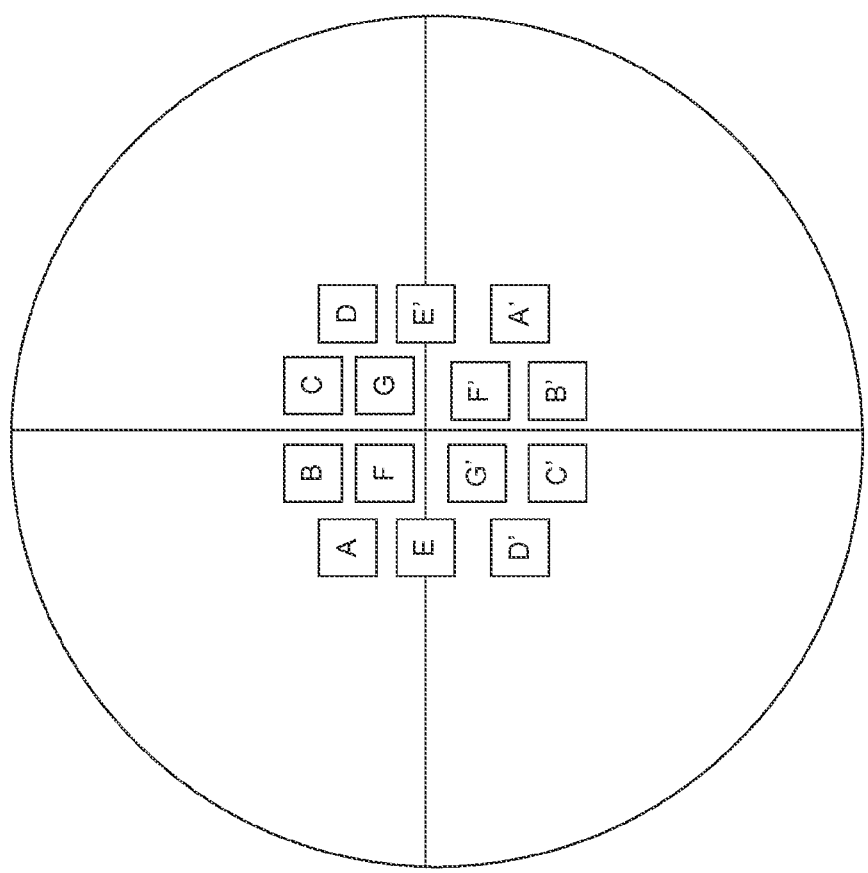
FIG. 14B illustrates a phosphor array arrangement for the remote phosphor light source.

FIG. 14A illustrates a cross-sectional view of a remote phosphor light source 1400. The remote phosphor light source 1400 includes LED array 1402 on a substrate 1404. On each of the LEDs of the LED array 1402 can be a limited angle collimating cup 1406. The first lens 1408 is placed over the LED array 1402 with a spacing therebetween. The first lens 1408 collimates light emitted from the LED array 1402. Collimated light rays are then capture by a second lens 1410. The first lens 1408 and the second lens 1410 are convex lenses, such as double convex lenses. The second lens 1410 then focuses the light rays towards a phosphor array 1412. Some amount of back scattering may occur when the phosphor array 1412 is excited by the light from the LED array 1402. It has been discovered that an optional short pass filter 1414 resolve the problem of back scattering. For example, the short pass filter 1414 may be a dichroic short pass filter. The short pass filter 1414 allows the high-frequency short wavelength light from the LED array 1402 to pass through. The short pass filter 1414, however, reflects the low-frequency high wavelength light emitted through the excited phosphor array 1412. When the configuration of the LED array 1402, the first lens 1408, the second lens 1410, the phosphor array 1412, and the short pass filter 1414 is symmetric, the reflection of the short pass filter 1414 places the reflective light rays at a window radially mirrored from where the LED array 1402 is. FIG. 14B illustrates a phosphor array arrangement for the remote phosphor light source. The phosphor array arrangement illustrates that phosphor modules of the phosphor array 1412 are placed in radially mirrored pairs of same color such that the short pass filter 1414 reflects light from a phosphor module to another phosphor module of the some color. The remote phosphor light source 1400 may be connected to a light source, such as the point light source 900, the point light source 1000, the collimated light source 1100, or the linear light source 1200, with the phosphor array 1412 acting as the LED arrays of the respective light sources.

Figure 15:
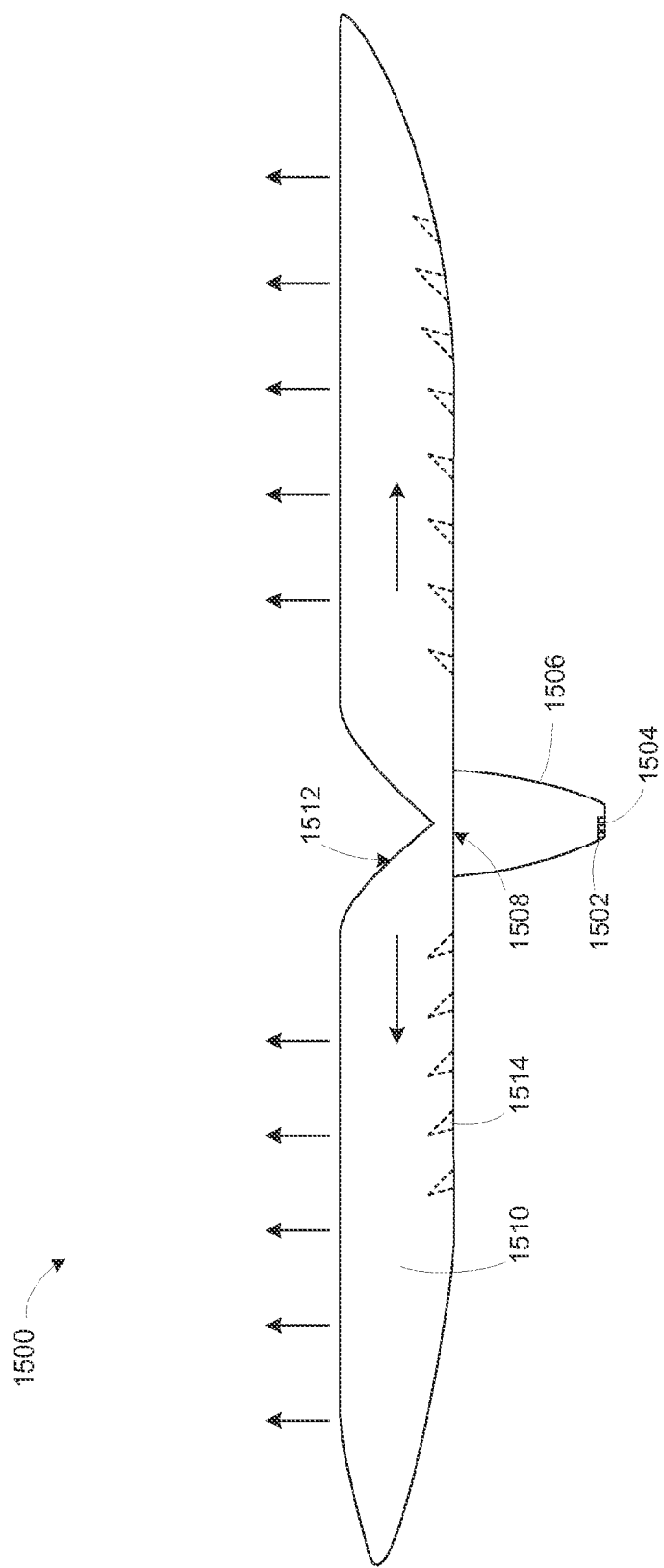
FIG. 15 illustrates an example cross-section of a dual-end linear light source.

FIG. 15 illustrates an example cross-section of a dual-end linear light source 1500. The dual-end linear light source 1500 includes an LED array 1502 on substrate 1504 with electronic circuitry to drive the LED array 1502. A collimation chamber 1506 is placed over and around the LED array 1502 on substrate 1504. The collimation chamber 1506 can be a parabolic wall with a reflective inner surface. An exit aperture 1508 of the collimation chamber 1506 across from the LED array 1502 its cover by a light mixing pipe 1510. The light mixing pipe 1510 has a vortex groove 1512 on the surface away from the collimation chamber 1506. The vortex groove 1512 in the light mixing pipe 1510 pushes light rays outwards on two ends. The light mixing pipe 1510 can include cutouts 1514 similar to the cutouts 1210 of the linear light source 1200.

Figure 16A:
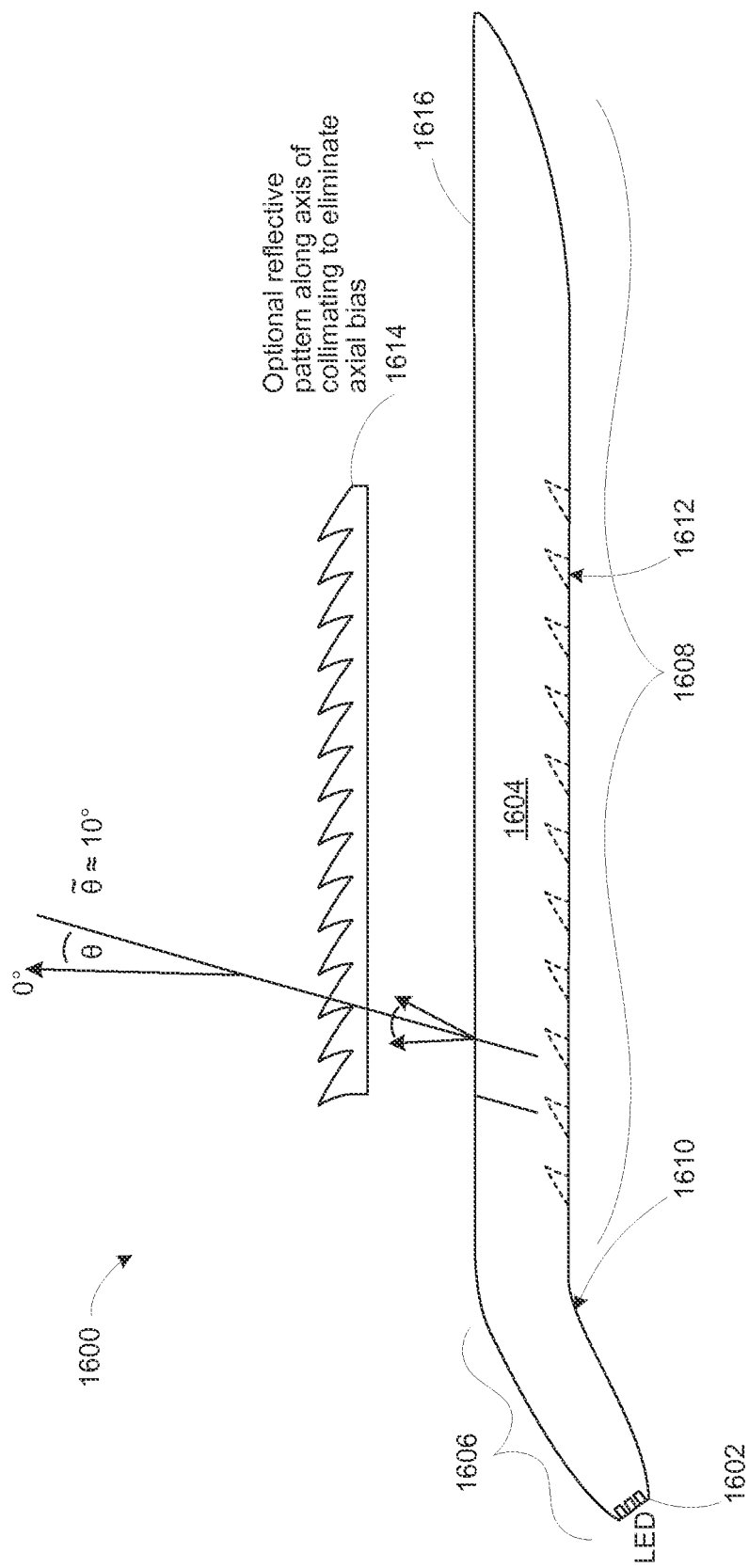
FIG. 16A illustrates an example cross-section of a serial linear light source.
Figure 16B:
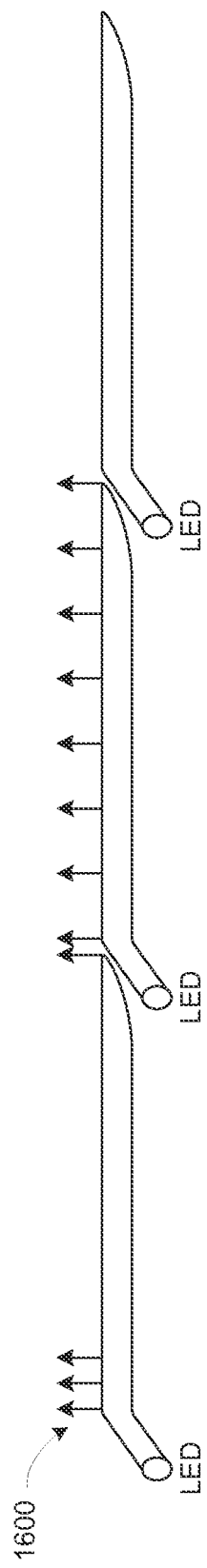
FIG. 16B illustrates how the serial linear light sources can be serially lined up.

FIG. 16A illustrates an example cross-section of a serial linear light source 1600. The serial linear light source 1600 is a variant of the linear light source 1200. The serial linear light source 1600 includes an LED array 1602. Place over the LED array 1602 is a light mixing pipe 1604. The light mixing pipe 1604 includes a first straight section 1606 and a second straight section 1608 with a bent 1610 therebetween. The light mixing pipe 1604 includes cutouts 1612 similar to the cutouts 1210 of the linear light source 1200. An optional refractive plate 1614 can be placed over an exiting aperture 1616 along the second straight section 1608 of the light mixing pipe 1604 to eliminate axial bias of light rays exiting the exiting aperture 1616. FIG. 16B illustrates how the serial linear light sources 1600 can be serially lined up.

Figure 17A:
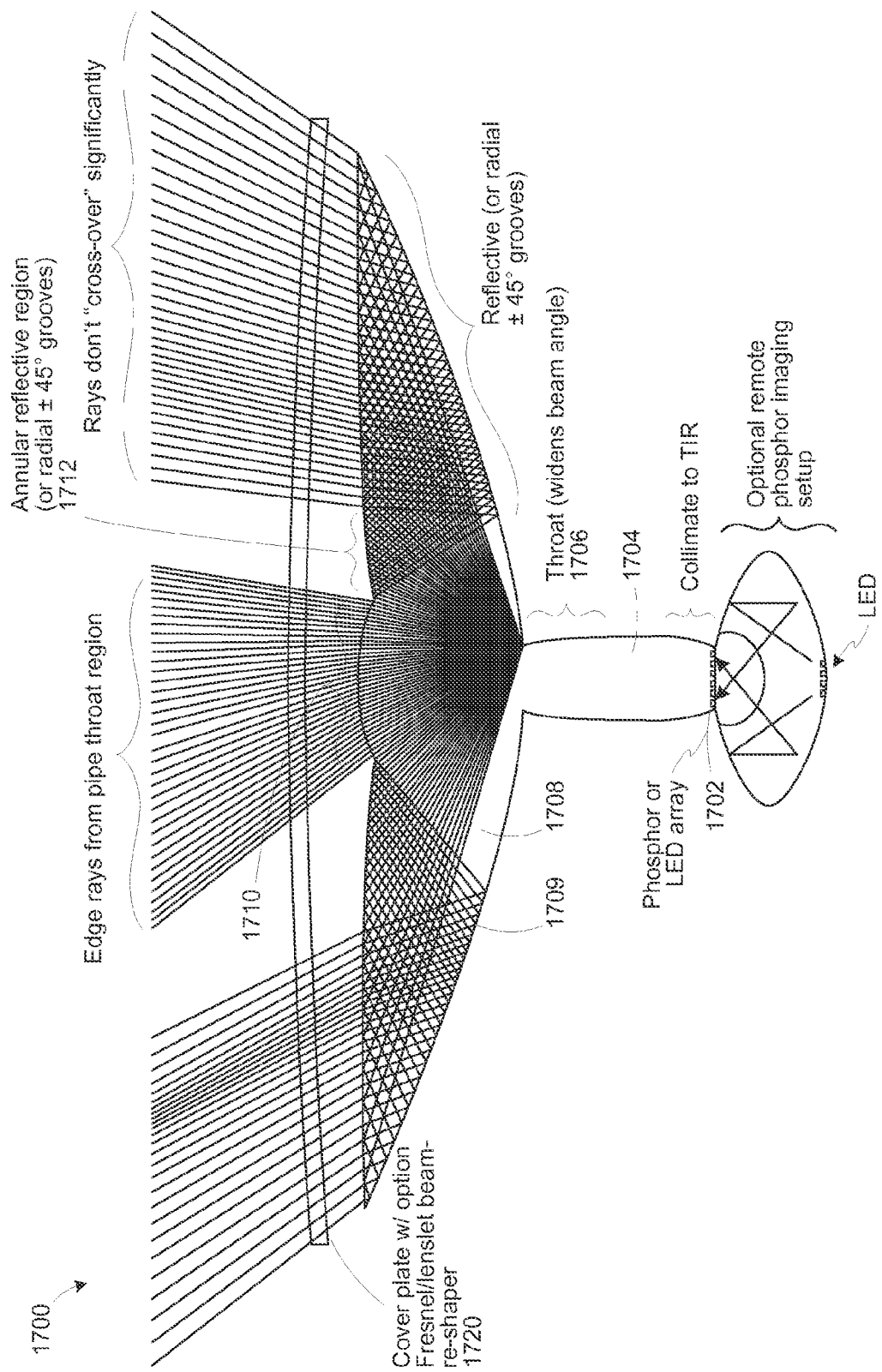
FIG. 17A illustrates a cross-sectional view of a collimated light source.
Figure 17B:
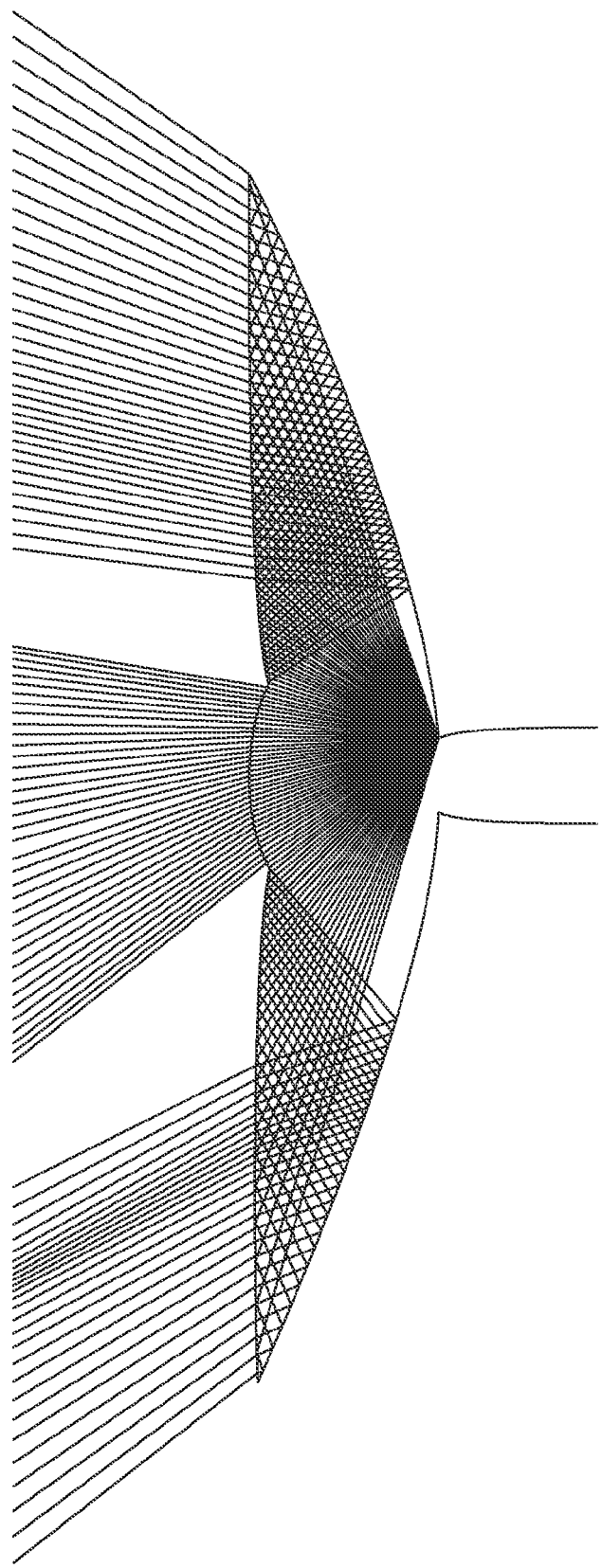
FIG. 17B illustrates a ray tracing light rays exiting a throat region of FIG. 17A.

FIG. 17A illustrates a cross-sectional view of a collimated light source 1700. The collimated light source 1700 includes a light emitter array 1702. The light emitter array 1702 can be an LED array or a phosphor array excited by a LED array, such as by the remote phosphor light source 1400. Over the light emitter array 1702 is a light mixing pipe 1704. The light mixing pipe 1704 can include vertical grooves running along the pipe axes to mix light. The light mixing pipe 1704 can narrow into a throat region 1706 that widens beam angle of light exiting the light mixing pipe 1704. FIG. 17B illustrates a ray tracing light rays exiting the throat region 1706 of FIG. 17A. A collimator 1708 is optically bonded to the light mixing pipe 1704. The collimator 1708 can have a bottom surface 1709 facing towards the light emitter array 1702 where the bottom surface 1709 has a reflective coating. Alternatively, the collimator 1708 can have grooves on the bottom surface 1709 similar to FIG. 11C and FIG. 11D. The bottom surface 1709 can be convex. The bottom surface 1709 can be parabolic.

The collimator 1708 includes a central convex protrusion 1710 on an opposite of the throat region 1706. Around the central convex protrusion 1710 is an annular reflective region 1712. The annular reflective region 1712 can be coated with reflective material or radially grooved similar to FIG. 11C and FIG. 11D. Optionally over the collimator 1708 is a cover plate 1720. The cover plate 1720 can be a Fresnel plate, a diffuser, a lenslet, or any combination thereof.

Figure 18A:
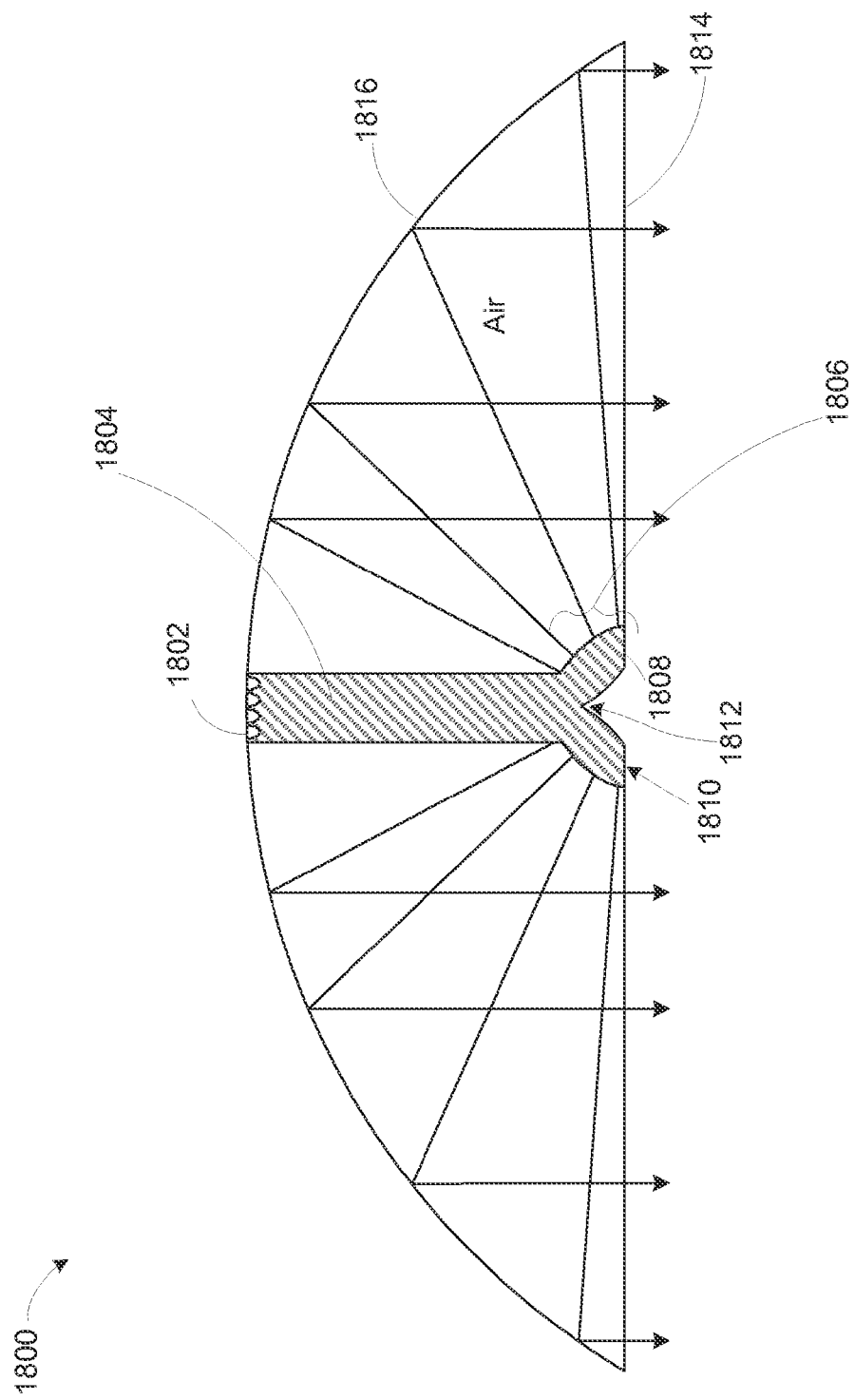
FIG. 18A illustrates a cross-sectional view of a flat collimated light source.

FIG. 18A illustrates a cross-sectional view of a flat collimated light source 1800. The flat collimated light source 1800 includes an LED array 1802. The light mixing pipe 1804 is attached over the LED array 1802. The light mixing pipe 1804 can include vertical grooves parallel to the pipe axes to mix light. Light mixing pipe 1804 is attached to a cup lens 1806. The cup lens 1806 can be part of the light mixing pipe 1804 or a lens attached to the light mixing pipe 1804. The cup lens 1806 extends in a convex fashion from the light mixing pipe 1804 outwards and away. The cup lens 1806 includes an annular flat portion 1808 with a reflective coating 1810. Inwards from the annular flat portion 1808 is a vortex groove 1812 concave into the cup lens 1806. A flat cover 1814 is attached to the annular flat portion 1808. The flat cover 1814 can be made of a clear material, such as glass. A reflector 1816 rests over the flat cover 1814 and the LED array 1802 with the light mixing pipe 1804 circumferentially surrounded by the reflector 1816. The reflector 1816 is symmetric. The reflector 1816 can be parabolic, a round bowl shape, or a square bowl shape.

Figure 18B:
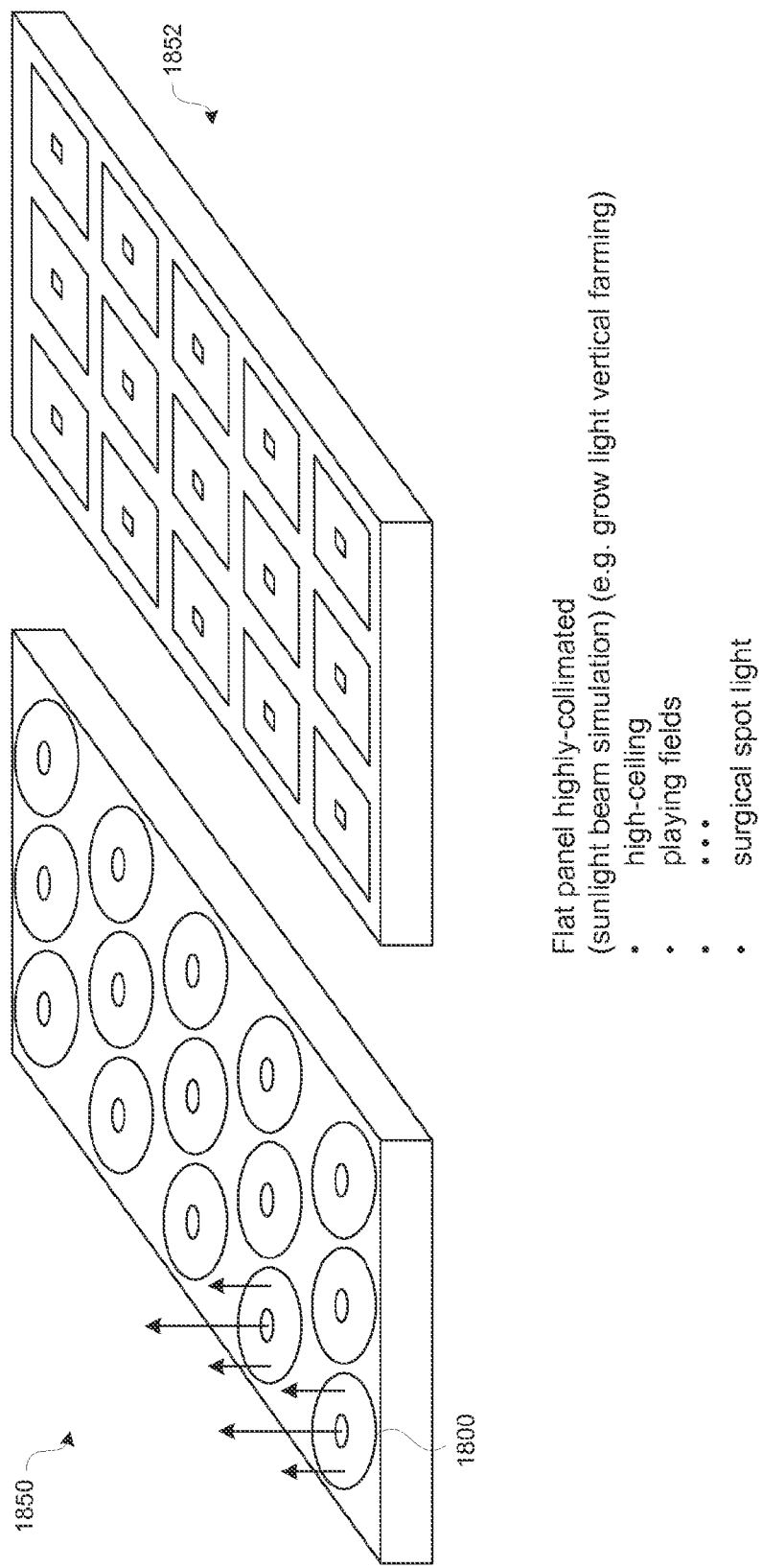
FIG. 18B illustrates a perspective view of flat panels utilizing an array of flat collimated light sources.

FIG. 18B illustrates an example perspective view of flat panels utilizing an array of the flat collimated light source 1800. The flat panels include a flat panel 1850. The flat-panel 1850 can be used to simulate sunlight beams, used as surgical spotlight, used to illuminate playing fields, or high ceiling illumination applications. A second flat panel 1852 is also illustrated utilizing an array of the flat collimated light source 1800 with a square bowl shaped outer shell.

Figure 19A:
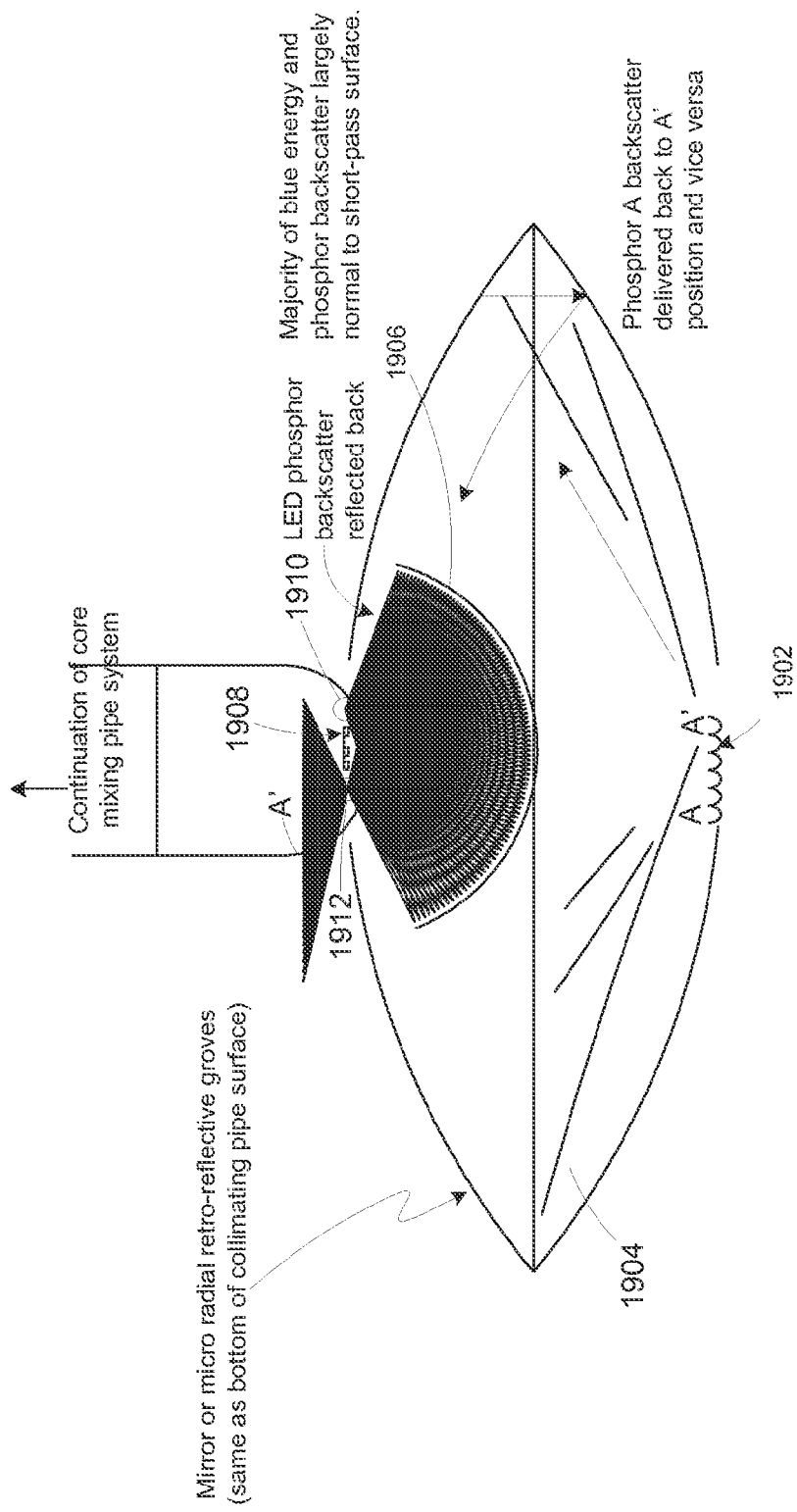
FIG. 19A illustrates a cross-sectional view of a remote phosphor light source.

FIG. 19A illustrates a remote phosphor light source 1900. The remote phosphor light source 1900 is a variant of the remote phosphor light source 1300. The remote phosphor light source 1900 includes an LED array 1902, such as a royal blue pump LED array, attached on one side of an imaging pipe 1904. The imaging pipe 1904 is a double convex lens. The imaging pipe 1904 includes small cup shapes around the LED array 1902 with the bottom of the small cup shapes directly over each LED.

Figure 19B:
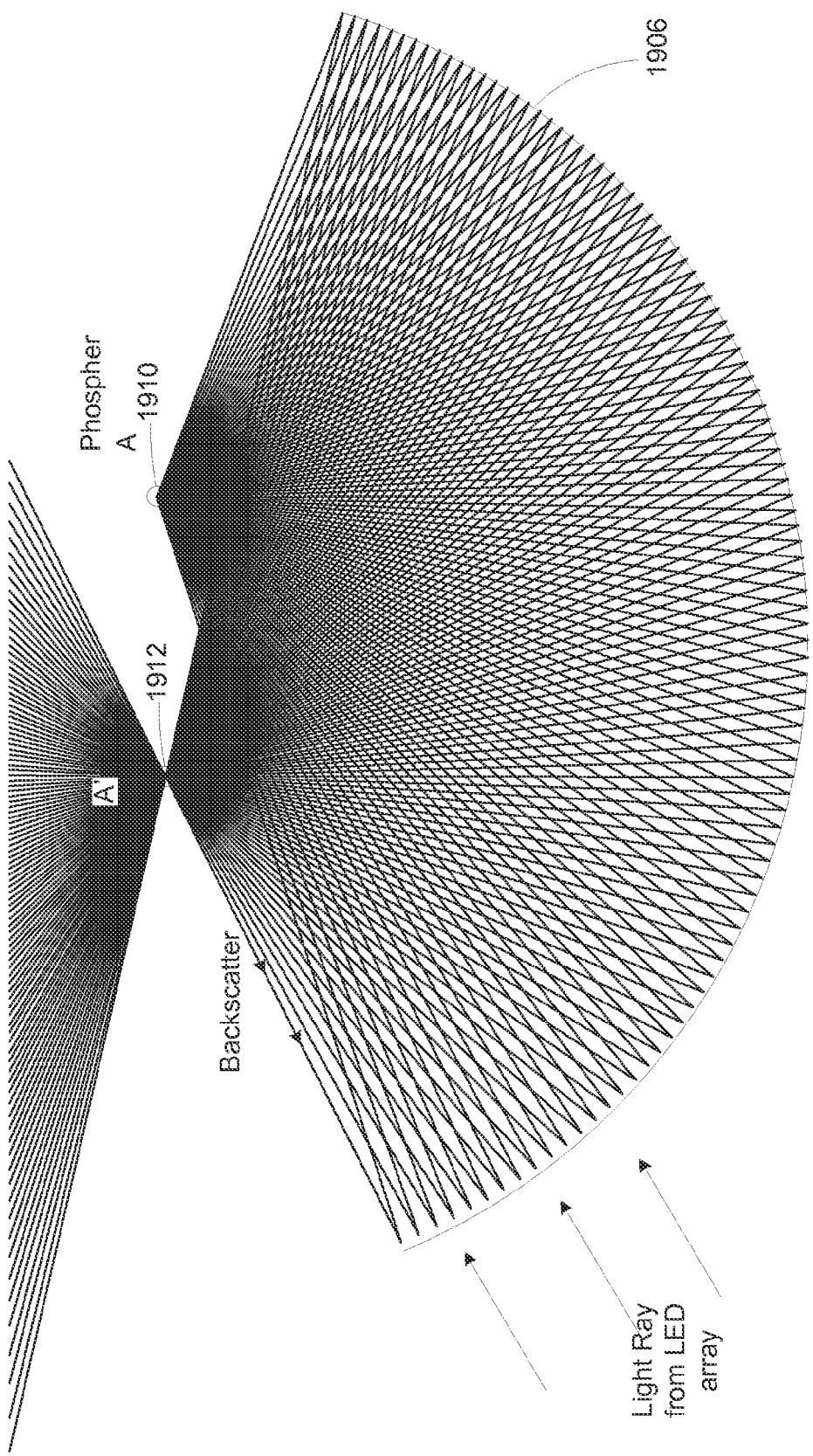
FIG. 19B is a ray tracing of the light back scattering from a first phosphor module to a second phosphor module via a short pass filter.

A hemispherical short pass filter 1906 may be embedded within the imaging pipe 1904. The imaging pipe 1904 is attached to a phosphor array 1908 on an opposite side of the imaging pipe 1904 from the LED array 1902. High-frequency light from the LED array 1902 can pass through the short pass filter 1906. However, the backscatter emitted from a first phosphor module 1910 of the phosphor array 1908 is reflected by the short pass filter 1906 to a second phosphor module 1912 at a position radially opposite to the first phosphor module 1910. FIG. 19B is a ray tracing of the light back scattering from the first phosphor module 1910 to the second phosphor module 1912 via the short pass filter 1906.

Figure 19C:
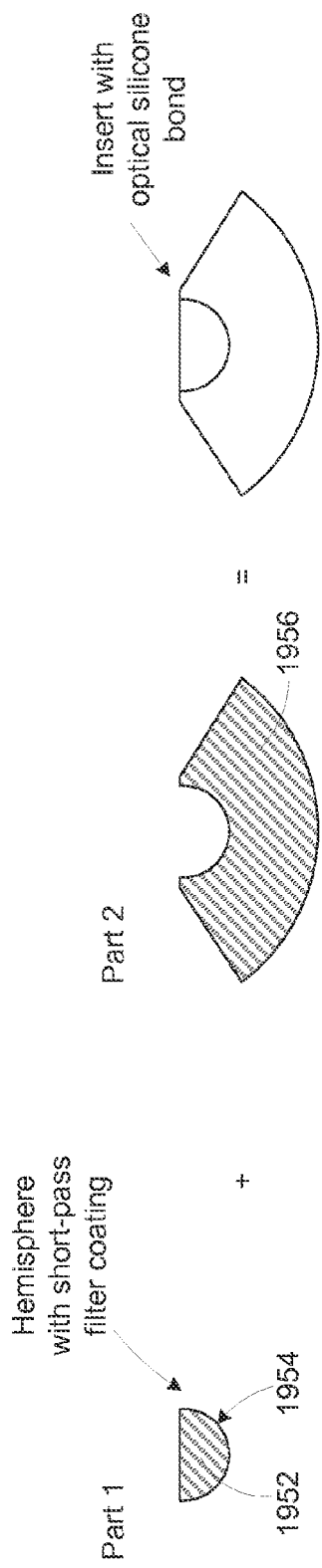
FIG. 19C illustrates a manufacturing process of embedding a hemispherical short pass filter.

FIG. 19C illustrates a manufacturing process of embedding the hemispherical short pass filter 1906. A hemisphere section 1952 of the imaging pipe 1904 is made. A short pass filter coating 1954 is coated onto the round part of the hemisphere section 1952. A base portion 1956 of the imaging pipe 1904 is then made. The base portion 1956 can be made from a mold of the shape of the hemisphere section around a mold of a double convex lens. Alternatively the hemisphere section 1952 and the base portion 1956 can be cut from the same double convex lens. Then the hemisphere section 1952 is inserted with an optical silicone bond to make the imaging pipe 1904.

Figure 19D:
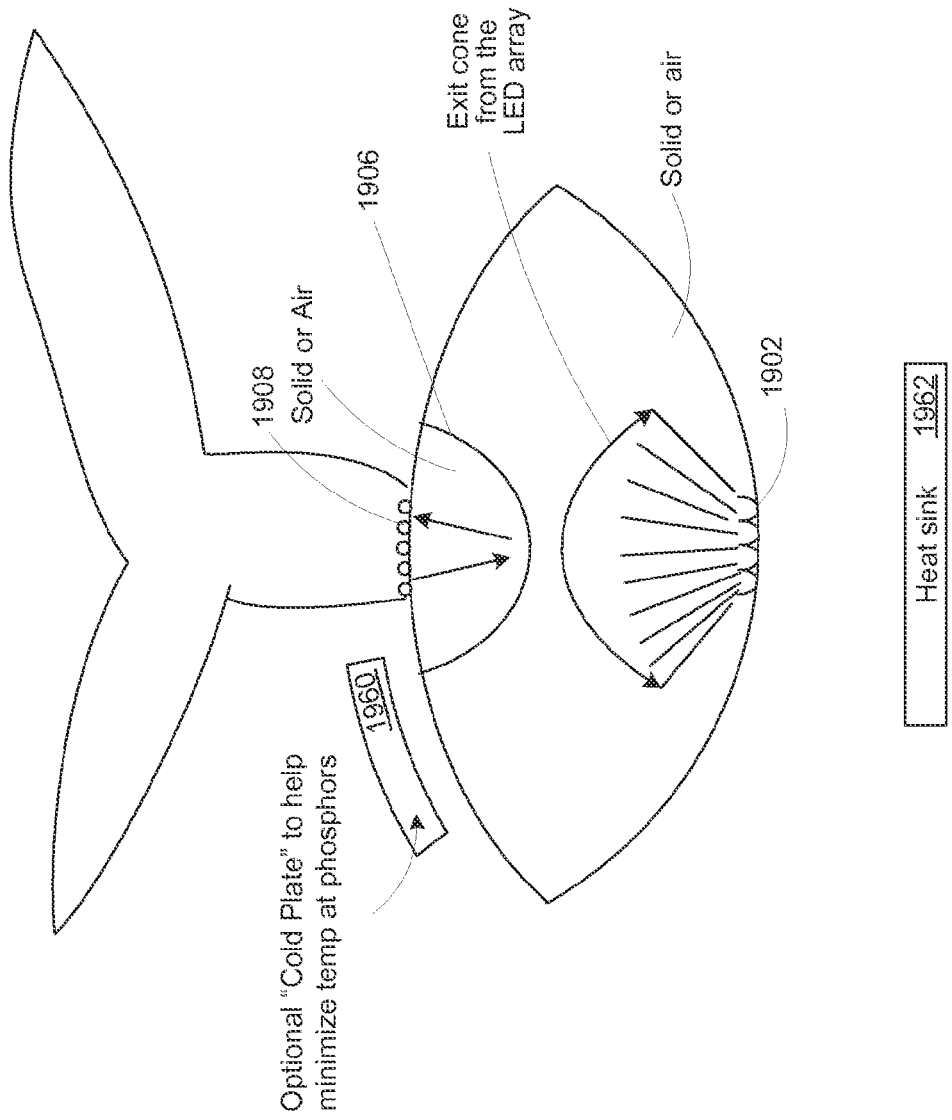
FIG. 19D illustrates a cross-sectional view of the remote phosphor light source with heat dissipation elements.

FIG. 19D illustrates a cross-sectional view of the remote phosphor light source 1900 with heat dissipation elements. Optionally, the remote phosphor light source 1900 can include a cold plate 1960 over the imaging pipe 1904. The cold plate 1960 can surround the phosphor array 1908 to minimize temperature at the phosphor array 1908. Optionally, the remote phosphor light source 1900 can also include a heat sink 1962 underneath the LED array 1902. Optionally, the LED array 1902 can be thermally coupled to the heat sink 1962 via a thermal conducting element. Portions of the imaging pipe 1904, optionally, may be replaced with air instead of solid, as illustrated.

Figure 20:
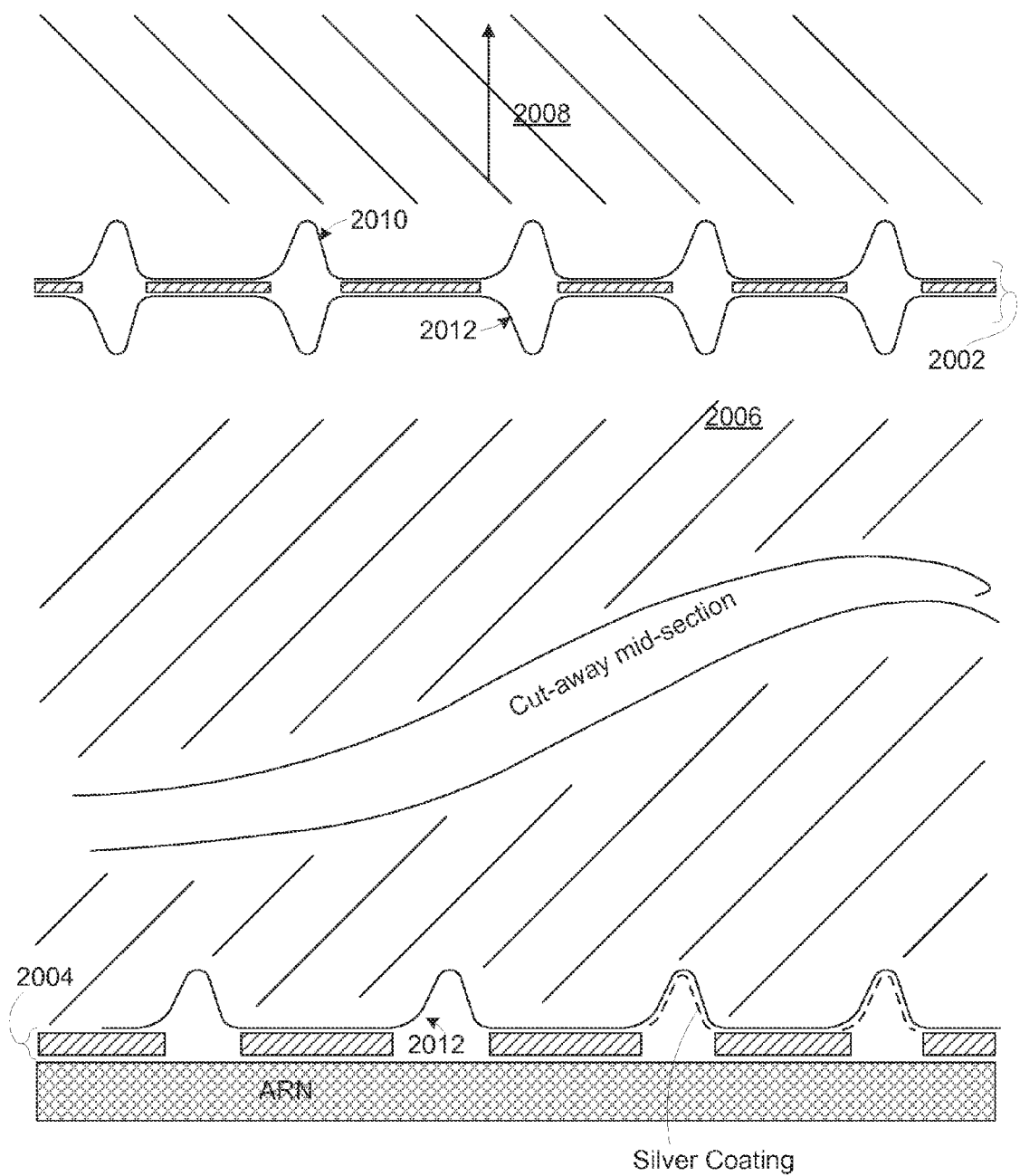
FIG. 20 illustrates a cross-section of an example configuration of a phosphor array and LED array in a remote phosphor light source.

FIG. 20 illustrates a cross-section of an example configuration of a phosphor array 2002 and LED array 2004 in a remote phosphor light source, such as the remote phosphor light source 1900, the remote phosphor light source 1300, or the remote phosphor light source 1400. The LED array 2004 may be, for example, blue LEDs such as sapphire or SiC InGaN flipchip. The phosphor array 2002 is sandwiched between an imaging pipe 2006 and a light mixing pipe 2008. A flat surface of the imaging pipe 2006 is on each phosphor module of the phosphor array 2002. A flat surface of the light mixing pipe 2008 is on each phosphor module of the phosphor array 2002. The flat surfaces can contact each phosphor module directly or an optical silicone bonded to each phosphor module. A first collimation well 2010 can form around the light mixing pipe 2008 between each of the phosphor modules. An imaging collimation well 2012 can form around the imaging pipe 2006 between each LED. The first collimation well 2010 and the imaging collimation well 2012 can have a vortex shape with a low angle of slant with respect to a normal vector from the flat surfaces. The first collimation well 2010 and the imaging collimation well 2012 can include reflective coating such as silver coating on their external surfaces. Similarly a flat surface of the imaging pipe 2006 is on each LED of the LED array 2004. The imaging pipe 2006 can include a second collimation well 2018 around the flat surface over each LED. The second collimation well 2018 can also be vortex shaped with the low angle of slant with respect to a normal vector from the flat surface over each LED.

Figure 21A:
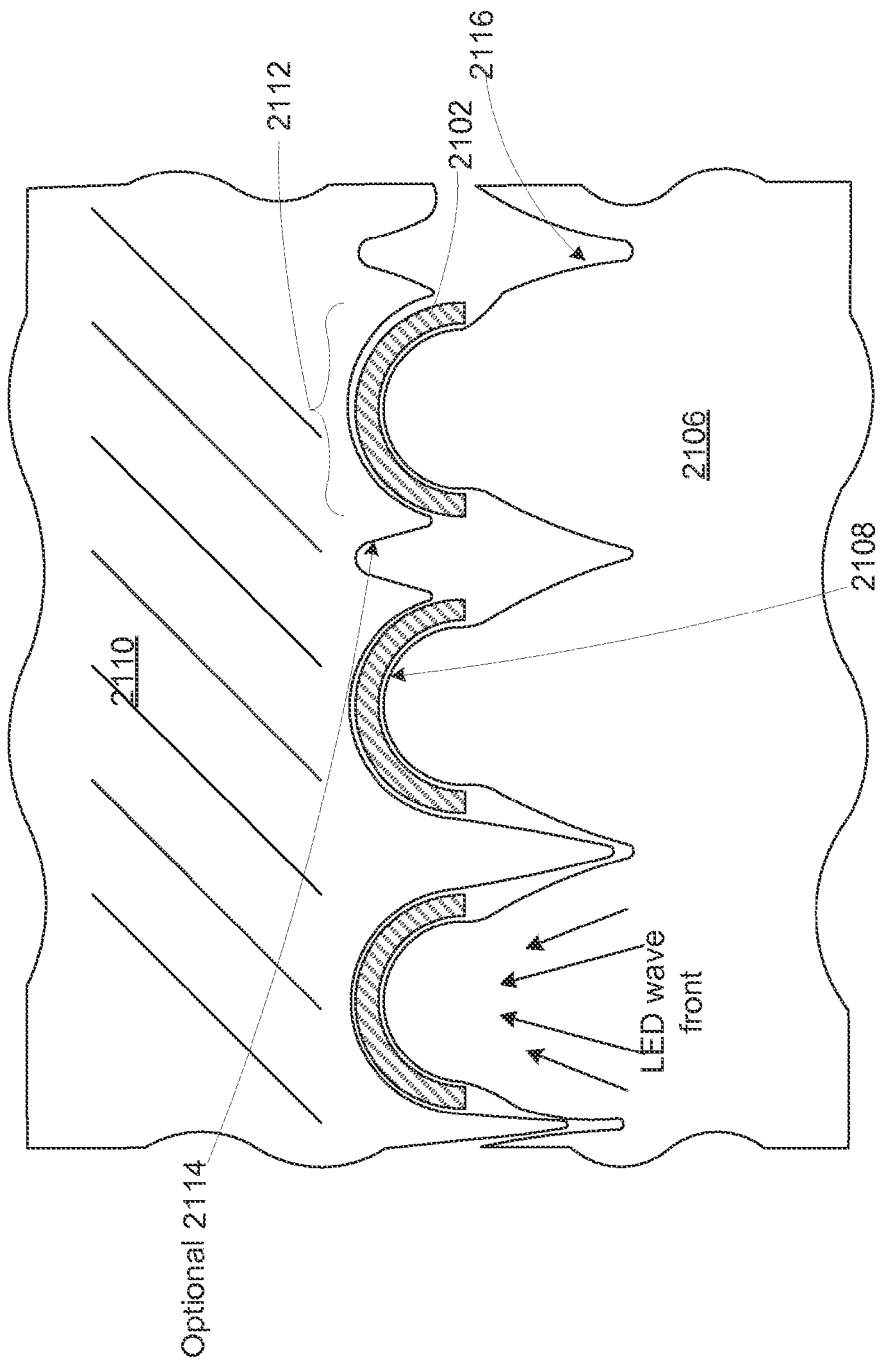
FIG. 21A illustrates a cross-section of an example configuration of a phosphor array in a remote phosphor light source.

FIG. 21A illustrates a cross-section of an example configuration of a phosphor array 2102 in a remote phosphor light source, such as the remote phosphor light source 1900, the remote phosphor light source 1300, or the remote phosphor light source 1400. The phosphor array 2102 can be hemispherical shaped. The hemispherical phosphor layer has been discovered to reduce back-scattering. The shape of the phosphor layer is not constrained to flat form since it is not against a LED surface. An imaging pipe 2106 can be attached on a concave side of the phosphor modules of the phosphor array 2102. The imaging pipe 2106 includes bumps 2108 that fit the concave side of the phosphor modules. A light mixing pipe 2110 includes cup shaped dents 2112 that fit a convex side of the phosphor modules. The light mixing pipe 2010 can optionally have a collimation well 2114. The imaging pipe 2106 has imaging wells 2116 in between the bumps 2108.

Figure 21B:
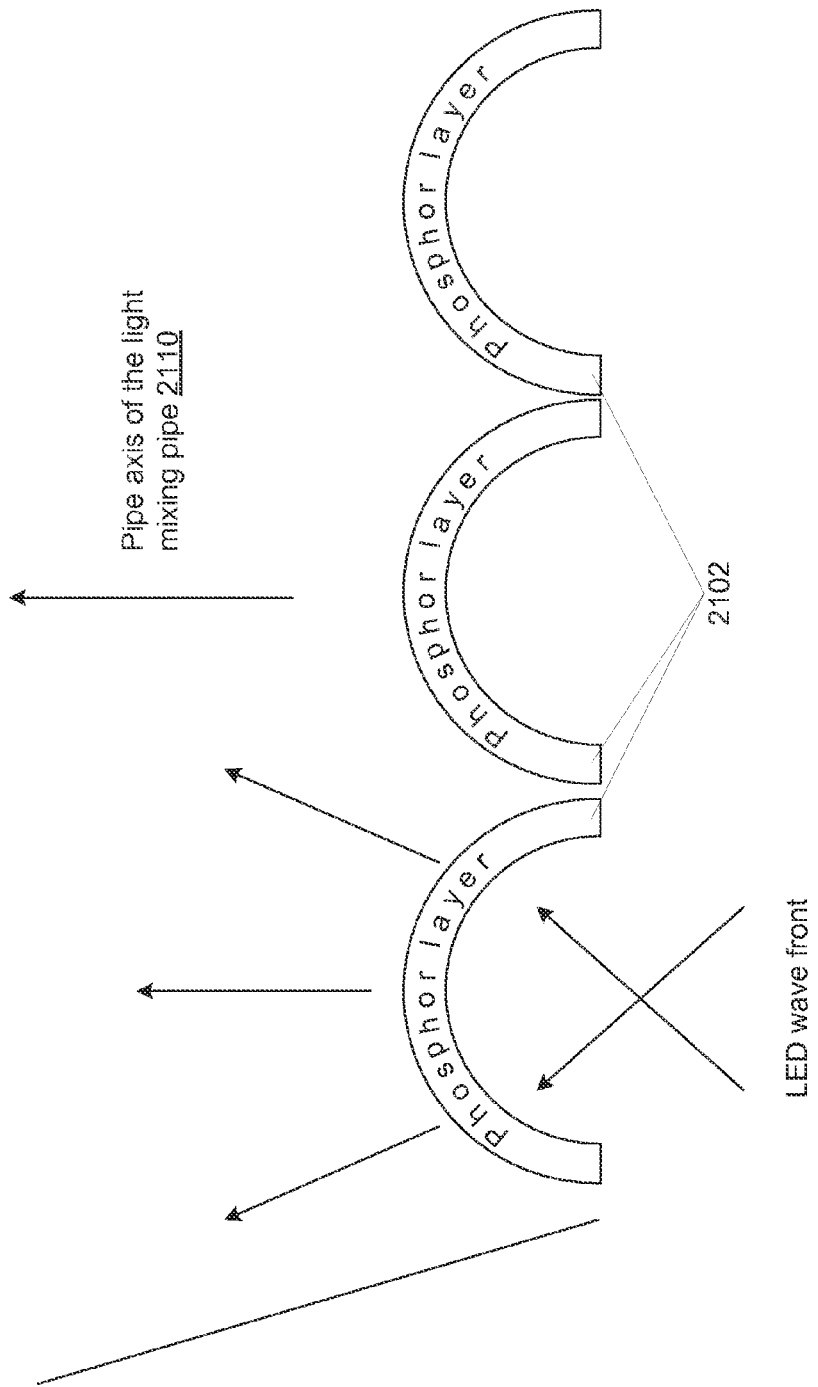
FIG. 21B illustrates a ray tracing of light emission from a phosphor array.

FIG. 21B illustrates a ray tracing of light emission from the phosphor array 2102. As illustrated, blue color light rays intersect phosphor layers of the phosphor array 2102 at a broad beam spread angle. Light emission from the phosphor array 2102 is narrowed as compared to the broad beam spread because of the structures illustrated in the light mixing pipe 2110.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

I claim:

1. A linear light source comprising:
   electronic circuitry to drive light emitting diodes (LEDs);
   a plurality of LEDs coupled to the electronic circuitry, the LEDs with more than one color type;
   a light pipe positioned to provide total internal reflection (TIR) of light rays emitted from the plurality of LEDs at light ray angles larger than a critical angle with respect to a normal vector of a surface of the light pipe; and
   a shell with a highly reflective inner surface over and along the light pipe, wherein the shell and the highly reflective inner surface are spaced apart with an air gap from the light pipe and conform to the shape of the light pipe;
   wherein the shell has an exit aperture along a pipe axis of the light pipe, wherein the exit aperture is an opening in the shell and in the highly reflective inner surface along the pipe axis; and
   wherein the light pipe has cut outs aligned across from the exit aperture, each of the cut outs having a slanted surface,
   wherein the light pipe is a cylinder with an elliptical cross-section having a first focal point and a second focal point, wherein an interface surface of at least one of the cut outs is aligned to the first focal point.

2. The linear light source of claim 1, wherein the elliptical cylinder has an ellipse major axis at least twice as long as an ellipse minor axis.

3. The linear light source of claim 1, wherein the light pipe has two straight sections with a bent therebetween.

4. The linear light source of claim 1, wherein the exit aperture is along a second section of the two straight sections after the bent.

5. The linear light source of claim 1, further comprising a Fresnel plate with grooves attached over the exit aperture to correct for axial bias of light rays exiting the exit aperture.

6. The linear light source of claim 1, wherein the cut outs are triangular wedge shapes.

7. The linear light source of claim 6, wherein the triangular wedge shapes has substantially a 45 degree angle with the pipe axis.

8. The linear light source of claim 1, further comprising a linear refractive collimating lens attached over the exit aperture.

9. The linear light source of claim 1, wherein spacing between neighboring cut outs increases as the neighboring cut outs are farther away from the plurality of LEDs along the pipe axis.

10. The linear light source of claim 1, wherein height of each of the cut outs increases as the each cut out becomes farther away from the plurality of LEDs along the pipe axis.

11. The linear light source of claim 1, wherein the light pipe narrows as the light pipe extends away from the plurality of LEDs.

12. A linear light source comprising:
a plurality of light emitting diodes (LEDs), the LEDs with more than one color type;
a mixing chamber with reflective walls surrounding an inner void to collimate light from the plurality of LEDs, wherein an exit aperture of the mixing chamber is larger than a source aperture of the mixing chamber around the plurality of LEDs, wherein the source aperture surrounds the LEDs and the exit aperture is opposite from the source aperture; and
a light pipe attached over the exit aperture of the mixing chamber, the light pipe extending in at least two directions from the exit aperture and providing total internal reflection of light rays from the plurality of LEDs for light ray angles larger than a critical angle with respect to a normal vector of a surface of the light pipe, wherein the exit aperture interfaces with the light pipe;
wherein the light pipe has cut outs aligned along the at least two directions, each of the cut outs having a slanted surface; and
wherein the light pipe includes a groove across from a portion of the light pipe over the exit aperture.

13. The linear light source of claim 12, further comprising a reflective coating on the groove.

14. The linear light source of claim 12, wherein the mixing chamber wall is parabolic.

15. The linear light source of claim 12, wherein the light pipe is narrowed as the light pipe extends towards the at least two directions.

16. A method of manufacturing a linear light source comprising:
providing a light emitting diode (LED) array, the LED array including multiple color types of LED;
coupling an electronic circuitry for driving the LED array;
attaching a light pipe over the LED array with a pipe axis of the light pipe extending away from the LED array, the light pipe positioned to provide total internal reflection (TIR) of light rays emitted from the LED array at light ray angles larger than a critical angle with respect to a normal vector of a surface of the light pipe;
forming cut outs from the light pipe, each of the cut outs with a slanted surface for reflecting part of light rays traveling down the light pipe out of the light pipe; and
enclosing the light pipe and the LED array with a shell, the shell having a linear slit aperture extending along the light pipe parallel to the pipe axis and across from the cut outs of the light pipe and the shell having a highly reflective inner surface spaced apart from and conforming to the light pipe;
wherein the light pipe is a cylinder with an elliptical cross-section having a first focal point and a second focal point, wherein an interface surface of at least one of the cut outs is aligned to the first focal point.

17. The method of claim 16 further comprising optically bonding the LED array to the light pipe with a silicone gel.

18. The method of claim 16 further comprising providing a collimation chamber around the LED array with a reflective inner wall to align the light rays from the LED array for TIR.

19. The method of claim 16 further comprising coating a portion of an outer surface of the light pipe around the LED array with a reflective coat, the reflective coat for aligning the light rays from the LED array for TIR.

* * * * *